United States Patent [19]
Connors et al.

[11] Patent Number: 5,341,302
[45] Date of Patent: Aug. 23, 1994

[54] JOB CONFIGURATION FOR SEMICONDUCTOR MANUFACTURING

[75] Inventors: Daniel P. Connors, Wappinger Falls; David D. Yao, Yorktown Heights, both of N.Y.

[73] Assignee: International Business Machines Corporation, Armonk, N.Y.

[21] Appl. No.: 872,878

[22] Filed: Apr. 23, 1992

[51] Int. Cl.$^5$ ............................................. G06F 15/46
[52] U.S. Cl. .................................... 364/468; 364/578
[58] Field of Search ............... 364/468, 402, 403, 578, 364/554

[56] References Cited

U.S. PATENT DOCUMENTS

| | | |
|---|---|---|
| 4,571,685 | 2/1986 | Kamoshida . |
| 4,796,194 | 1/1989 | Atherton . |
| 4,807,108 | 2/1989 | Ben-Arieh et al. . |
| 4,887,218 | 12/1989 | Natarajan . |
| 4,896,269 | 1/1990 | Tong . |
| 4,901,242 | 2/1990 | Kotan . |
| 5,053,970 | 10/1991 | Kurihara et al. . |
| 5,099,431 | 3/1992 | Natarajan ............................ 364/468 |
| 5,111,404 | 5/1992 | Kotani ................................. 364/468 |
| 5,155,679 | 10/1992 | Jain et al. ............................ 364/468 |
| 5,170,355 | 12/1992 | Hadavi et al. ....................... 364/468 |

OTHER PUBLICATIONS

B. Fox, "Discrete Optimization Via Marginal Analysis" *Management Science*, vol. 13, No. 3, pp. 210–216, Nov. 1966.

Lai et al., "Maximally Dependent Random Variables", *Proc. Nat. Acad. Sci.*, vol. 73, No. 2, pp. 286–288, Feb. 1976.

Y. L. Tong, *Probability Inequalities in Multivariate Distributions*, Academic Press, pp. 84–93, 1980.

Florin Avram and Lawrence Wein, "A Product Design Problem in Semiconductor Manufacturing", 1989.

Singh et al., "A Wafer Design Problem in Semiconductor Manufacturing for Reliable Customer Service", *IEEE Transactions on Comp., Hybrids, and Manufact. Tech.*, vol. 13, No. 1, pp. 103–108, Mar. 1990.

Michelle Fret et al., "Chip to Wafer Assignment Algorithms for Set Serviceability", A Master of Engineering Project Report, Cornell University, May 1990.

Ramakrishna Akella et al., "Strategies for Semiconductor Wafer Design: The Chip Allocation Problems", *ORSA/TIMS Joint National Meeting*, Oct. 1990.

C. Tang, "Composing Batches with Yield Uncertainty", Operations and Technology Management Working Paper 7-90, School of Management at UCLA, Nov. 1990.

*Primary Examiner*—Jerry Smith
*Assistant Examiner*—Brian C. Oakes
*Attorney, Agent, or Firm*—Sterne, Kessler, Goldstein & Fox

[57] ABSTRACT

An apparatus and method for configuring semiconductor jobs to achieve a desired level of set serviceability, in either probability or expectation, using a minimal number of wafers. The configuration problem is formulated as a mathematical optimization, where the serviceability level and yield losses, at chip, wafer and job levels, are explicitly considered. The problem is then reformulated by replacing the mathematically intractable service level constraints with tractable lower bounds. The reformulated mathematical optimization is efficiently solved using marginal allocation, giving good, feasible solutions to the original configuration program.

28 Claims, 11 Drawing Sheets

```
┌─────────────────────────────────────────┐
│  SOLVE REFORMULATED MATHEMATICAL        │
│  OPTIMIZATION FOR P1 OF SPJ USING       │
│  MARGINAL ALLOCATION                    │
└─────────────────────────────────────────┘
                    │
                    ▼
┌─────────────────────────────────────────┐
│ INITIALIZE $x_i^J$, i=1,...,n, SO THAT  │
│ AT LEAST ONE JOB OF CHIP TYPE i         │──410
│ SURVIVES WITH PROBABILITY $\delta$      │
└─────────────────────────────────────────┘
                    │
                    ▼
┌─────────────────────────────────────────┐
│ $LB1(X^J) \leftarrow \prod_{i=1}^{n} PROB(Y_i(x_i^J) \geq D_i)$ │──412
└─────────────────────────────────────────┘
                    │
                    ▼
              ╱───────────╲     YES    ┌──────────────────────┐
             ╱ $LB1(X^J) \geq \delta$?╲────────▶│ RETURN $X^J$, $LB1(X^J)$ │
              ╲───────────╱                    └──────────────────────┘
                    │ NO  414                          416
                    ▼
┌─────────────────────────────────────────┐
│                   $\ln\left(\frac{LB1(X^J+e_i)}{LB1(X^J)}\right)$ │
│ MARGINAL(i) ← ─────────────────────────── │──418
│                           $W_i$           │
└─────────────────────────────────────────┘
                    │
                    ▼
┌─────────────────────────────────────────┐
│ $\hat{i} \leftarrow$ ARG MAX {MARGINAL(i)}│──420
│                 i                         │
└─────────────────────────────────────────┘
                    │
                    ▼
┌─────────────────────────────────────────┐
│ $X^J \leftarrow X^J + e_{\hat{i}}$      │──422
└─────────────────────────────────────────┘
```

JOB CONFIGURATION FOR SEMICONDUCTOR MANUFACTURING

TECHNICAL FIELD

The present invention relates generally to the field of semiconductor manufacturing. More particularly, the present invention relates to a method and apparatus for configuring jobs in semiconductor manufacturing.

BACKGROUND ART

Job configuration for semiconductor manufacturing is the technique in which silicon chips are assigned to sites on wafers, wafers are assigned to jobs, and jobs are released into the manufacturing line, so as to meet the demand for chips. The process is complicated by yield uncertainties of the line and the configuration constraints imposed by the technology of the line. Yield losses can occur at a job level, where every chip within a job is bad, at a wafer level, where every chip on a wafer is bad, or at the site level, where one or more individual chips are bad.

In the static job configuration problem, the configuration is determined in an open loop fashion from data on the demanded numbers of chips and the yield uncertainties. A decision is made on the configuration, and the configuration is released into the line; neither cycle time nor the status of the jobs within the line are considered.

There are several measures of performance for meeting the demand. The semiconductor supplier may be measured on its "volume serviceability," the percent of the volume of the demand that is met. In a more stringent measure of performance called "mix serviceability," the supplier is measured in terms of the volume of demand supplied, but is not credited for shipping parts in excess of their demand. "Set serviceability" is another measure of performance. A customer may order a specified number of sets of components, for example, the set of chips needed for a printed circuit board or module. In set serviceability, the supplier is measured in terms of the demand for complete sets that is supplied. Set serviceability is more difficult to meet than mix or volume serviceability.

In meeting set serviceability requirements for the static job configuration problem, it is desirable that the configurations achieve the serviceability with the fewest number of wafers. Minimizing the number of wafers reduces the costs for the raw materials and reduces the number of wafers flowing through the line.

The technologies used to expose wafers (optical, e-beam and retical) and test equipment limitations may impose constraints on the possible job configurations. Some semiconductor manufacturing lines process single part jobs, where every chip within a job is identical. The job configuration required for such a line is referred to as a single part job or SPJ configuration scenario. Other manufacturing lines have more flexibility and allow for multiple part jobs having single part wafers, where every chip within a wafer is identical, but wafers within a job may be different. The job configuration required for such a line is referred to as a single part wafer or SPW configuration scenario. Some manufacturing lines process multiple part jobs having multiple part wafers, where a wafer (and therefore a job) may be made up of a plurality of different chips. The job configuration required for such a line is referred to as a multiple part wafer or MPW configuration scenario.

The logistics systems controlling the flow of jobs through the line may impose additional constraints on the allowable job configurations. For example, these systems may require that a job configuration having multiple part jobs with single part wafers be composed of several copies of the same standard job. In the multiple part jobs with multiple part wafers case, the systems may require that every multiple part wafer be identical, that is, there be a standard wafer, and every job within the configuration contains the standard wafer.

A conventional approach to semiconductor job configuration is known as ground start ratio. According to ground start ratio, the number of chip starts is the ratio of the demand for the chip type to the overall yield of the chip type. This ratio is computed independently for each chip in the set.

Because the job configuration data for each of the chip types is computed without reference to demand data, yield data or configuration data of any other chip type, the computation required for the ground start ratio is straightforward and does not require an excessive amount of time to compute. However, the survival rates of the chip types which make up a set are not independent of one another in determining the survival rate of the entire set. Consequently, the ground start ratio approach is ill-suited to suppliers measured by set serviceability.

Furthermore, because the ground start ratio is computed independently for each chip type, it cannot be used to take advantage of the substantial potential serviceability increases gained by using single part wafer and multiple part wafer configurations.

Therefore, what is needed is an apparatus and method for manufacturing sets of chips that achieves the desired serviceability using a reasonable number of wafers.

DISCLOSURE OF THE INVENTION

Accordingly, the present invention is an apparatus and method for configuring semiconductor jobs to achieve a desired level of set serviceability, in either probability or expectation, using a minimal number of wafers. The present invention comprises means for determining input parameters, means for generating an optimization problem, means for reformulating the optimization problem, means for solving the optimization problem and means for controlling the configuration of a semiconductor manufacturing line.

The means for determining input parameters receives the desired serviceability level, an indication of whether that level is a probability (referred to as P1) or an expectation (referred to as P2), an indication of whether the manufacturing line has a SPJ, SPW or MPW configuration scenario, the number of chip sets demanded, the number of each different chips each chip type in the chip set, the number of wafers in a job, the number of chip sites on a wafer and chip, wafer and job yield data.

The means for generating an optimization problem receives the input parameters and constructs a mathematical optimization. Generally speaking, a mathematical optimization is a description of an optimization problem which comprises an objective function and a set of constraints. In the present invention, the objective function is to minimize the number of jobs, and the constraint is to meet the desired serviceability level. The optimization problem in the present invention is to ascertain a job configuration by determining decision variable values given the input parameters. Depending on the job configuration scenario, the decision variable values may indicate: (1) the number of single part jobs of each chip type, (2) the number of single part wafers of each chip type in a standard multiple part job and the number of standard multiple part jobs, or (3) the number of chips of each type in a standard multiple part wafer and the number of standard multiple part jobs.

Meeting the constraint makes the mathematical optimization mathematically intractable. A mathematically intractable problem belongs to a class of problems which, for all but very small instances, there is no known way to solve in a reasonable amount of time. Therefore, the means for reformulating the mathematical optimization receives the optimization problem and replaces the initial constraint with a lower bound. The lower bound is set to exceed the desired serviceability level (for P1) or the demanded number of chip sets (for P2). This ensures that the desired serviceability is obtained for the original problem when the reformulated problem is solved.

The means for solving the mathematical optimization then receives the reformulated mathematical optimization and solves it by performing marginal allocation to determine the decision variable values. Finally, the means for controlling the manufacturing line releases jobs into the line according to the decision variable values.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 4 is a flowchart which illustrates the operation of a SPJ solver of FIG. 3A in computing a P1 formulation measure;

BEST MODES FOR CARRYING OUT THE INVENTION

Overview

The present invention is directed towards an apparatus and method for configuring a semiconductor manufacturing line so as to manufacture chip sets at a desired serviceability level without using an excessive number of wafers. More specifically, the present invention is directed towards an apparatus and method for controlling a semiconductor manufacturing line by specifying the number of jobs released and the composition of each job.

Figure 1:
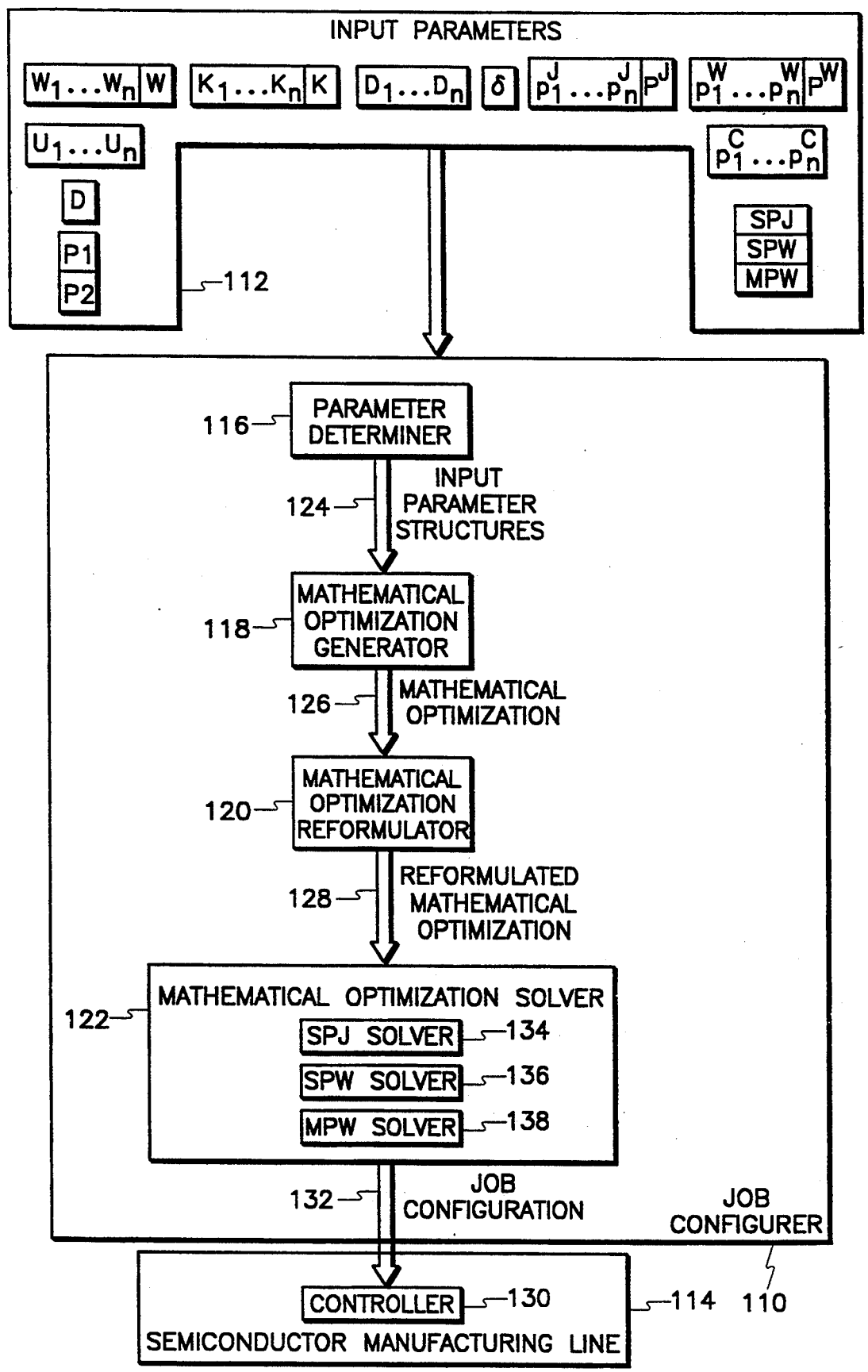
FIG. 1 is a block diagram of the structure of the present invention.

FIG. 1 is a block diagram of the structure of the present invention. Looking at FIG. 1, the present invention essentially comprises a job configurer 110, input parameters 112, and a semiconductor manufacturing line 114. The job configurer 110 comprises a parameter determiner 116, a mathematical optimization generator 118, a mathematical optimization reformulator 120, and a mathematical optimization solver 122.

Figure 2:
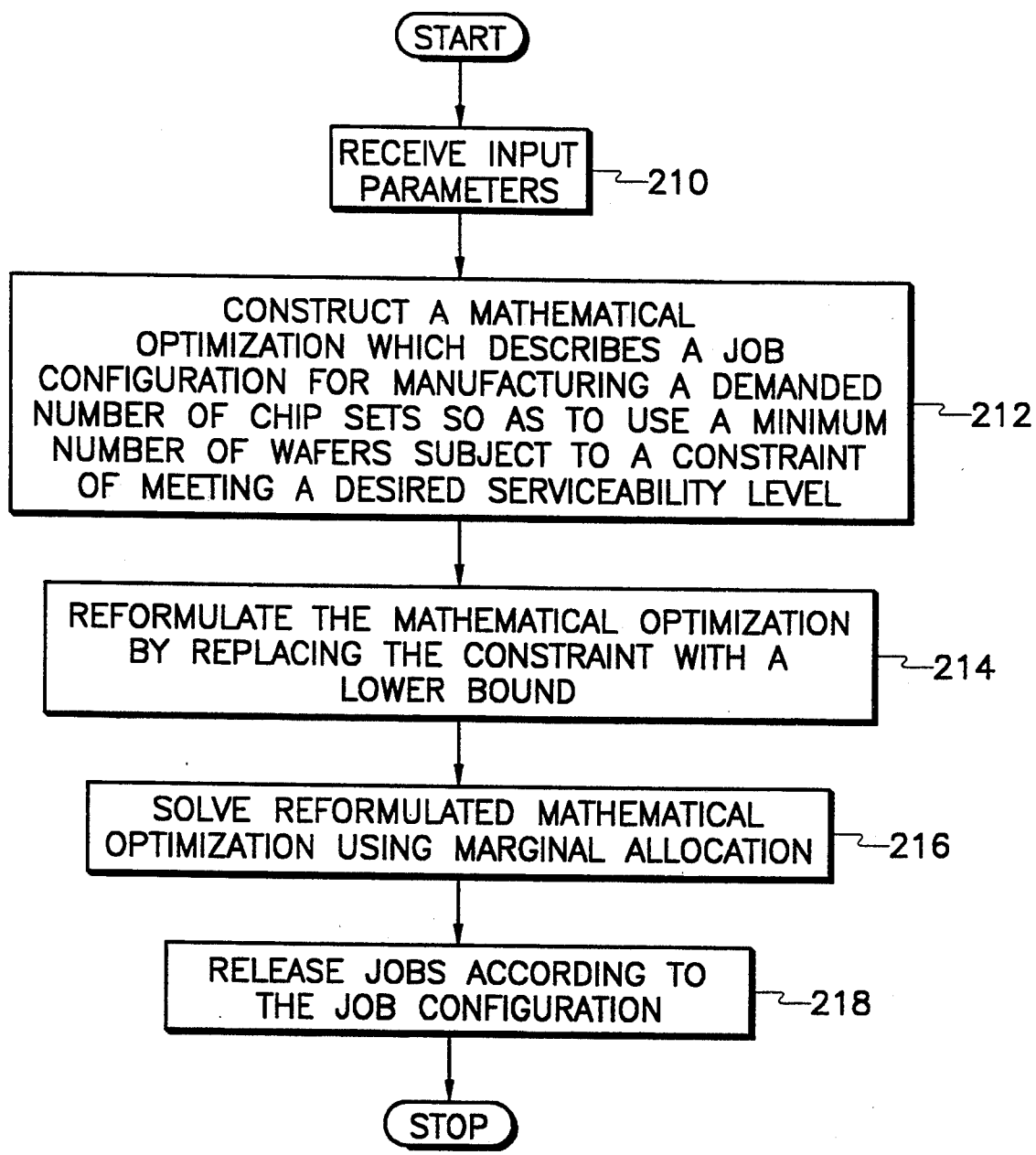
FIG. 2 is a flowchart of the operation of the job configurer of FIG. 1.

FIG. 2 is a flowchart which illustrates the operation of the present invention. In a step 210 of FIG. 2, the parameter determiner 116 of FIG. 1 receives the input parameters 112 and places them in appropriate data structures. The input parameters 112 describe the desired chip sets, the configuration aspects inherent in manufacturing line, chip yield data and demands made by the operator of the manufacturing line. The input parameters 112 could be stored in an environment file associated with the job configurer 110. Alternatively, a user could enter this data interactively.

The mathematical optimization generator 118 receives input parameter structures 124 from the parameter determiner 116. In a step 212, the mathematical optimization generator 118 generates a mathematical optimization to minimize the number of wafers used subject to meeting the desired performance measure (P1 or P2). Specifically, it generates a program for producing the demanded number of chips of each type with a minimum number of wafers and subject to a constraint of meeting the desired performance measure.

Meeting the constraint makes the mathematical optimization mathematically intractable. A mathematically intractable problem belongs to a class of problems which, for all but very small instances, there is no known way to solve in a reasonable amount of time. Therefore, the mathematical optimization reformulator 120 receives the mathematical optimization 126 and, in a step 214, replaces the performance measure constraint with a lower bound. The lower bound is set to exceed the desired serviceability level (for P1) or the demanded number of chip sets (for P2). This ensures that the desired serviceability is obtained for the original problem when the reformulated problem is solved.

The mathematical optimization solver 122 receives reformulated mathematical optimization 128 from the mathematical optimization reformulator 120. The mathematical optimization solver 122 uses a marginal allocation technique to solve the reformulated mathematical optimization 128 and thereby determine the manufacturing configuration.

A controller 130 of the semiconductor manufacturing line 114 receives a job configuration 132 from the mathematical optimization solver 122. In a step 218, the controller 130 coordinates production so that jobs are released according to the job configuration 132.

Input Parameters

The input parameters 112 describe the desired chip sets by specifying the number of times each chip type is used in the set (designated "$u_i$", where $i=1, \ldots, n$ and each value of "i" identifies one of n chips in the chip set). The input parameters 112 further describe configuration aspects inherent in manufacturing line by specifying the number of wafers in a job and the number of chip sites on a wafer, and whether the job configuration scenario is SPJ, SPW or MPW.

Demands made by an operator of the manufacturing line are also included in the input parameters 110. These demands include the demanded number of chip sets (referred to as "D") and an indication of whether the performance measure is P1 or P2. If the performance measure is P1, the operator also specifies a desired serviceability level (referred to as "$\delta$"). The desired serviceability level is a probability that the demanded number of chip sets will be successfully manufactured. In the P2 formulation, the expected number of chip sets successfully manufactured is no less than the demanded number of chip sets. A chip set is successfully manufactured if all of its component parts are manufactured without defect.

From the chip set description and the demands of the operator, the total number of chips of each particular type (represented "$D_i$") is calculated. $D_i$ is the product of D and $u_i$, where $i=1, \ldots, n$.

Finally, the input parameters 112 include chip yield data. In the SPJ scenario, $p_i^J$ indicates the probability that a single part job of chip type i is "good" (i.e., manufactured without defect). For the SPW and MPW scenarios, a value $p^J$ represents the probability that the standard multiple-part job is good. A value $p_i^W$ indicates in the SPJ and SPW scenarios, the probability that a single part wafer of type i is good given the job it is in is good. The value $p_i^C$ indicates the probability that a chip of type i is good given that the job it is in is good and the wafer it is on is good.

Regarding the yield data, note that the loss of an entire job is modelled as a bernoulli random variable. Job losses are assumed to be independent. Given that an entire job is not lost, individual wafers within a job may be lost. Wafer losses within a good job are assumed to be independent and are modelled as bernoulli random variables. Finally, given that a job is good and a wafer within a job is good, the yield of an individual chip is modelled as a bernoulli random variable. The yield of chips within a good wafer are assumed to be independent.

Decision Variables

The job configuration 132 is described by decision variables. A decision variable $x_i^J$, used in the SPJ scenario, indicates the number of single part jobs of chip type i in the job configuration 132. Let $X^J = (x_1^J, \ldots, x_n^J)$. A decision variable $x_i^W$, used in the SPW scenario indicates the number of single part wafers of chip type i in the standard multiple part job configuration. Let $X^W = (x_1^W, \ldots, x_n^W)$. A decision variable $x_i^C$, used in the MPW scenario, indicates the number of chips of type i in the standard multiple part wafer. Let $X^C = (x_1^C \ldots x_n^C)$. A decision variable J, used in the SPW and MPW scenarios, indicates the number of standard multiple part jobs in the job configuration 132.

Random Variables

The following random variables are used in the mathematical optimizations. Those which are problem scenario specific are indicated with (SPJ), (SPW) and (MPW).

There are three chip yield random variables. First $Y_i(x_i^J)$ indicates the number of good chips of type i produced from the configuration having $x_i^J$ single part jobs of chip type i (SPJ). Second $Y_i(J,x_i^W)$ indicates the number of good chips of type i produced from J releases of the standard multiple part job having $x_i^W$ single part wafers of chip type i (SPW). Third $Y_i(J,x_i^C)$ indicates the number of good chips of type i produced from J releases of the standard multiple part job having $x_i^C$ chips of type i on the standard wafer (MPW).

There are three set yield random variables. First $Z(x_1^J, \ldots, x_n^J)$ indicates the number of sets formed from the configuration having $x_i^J$, $i=1, \ldots, n$, single part jobs of chip type i (SPJ). Specifically, $$Z(x_1^J, \ldots, x_n^J) = \min_i \left\{ \left\lfloor \frac{Y_i(x_i^J)}{u_i} \right\rfloor \right\}$$

Note that $\lfloor x \rfloor$ denotes the floor of x.

Second, $Z(J;x_1^W, \ldots, x_n^W)$ indicates the number of sets formed from J releases of the standard multiple part job configuration having $x_i^W$, $i=1, \ldots, n$, single part wafers of chip type i (SPW). Specifically, $$Z(J; x_1^W, \ldots, x_n^W) = \min_i \left\{ \left\lfloor \frac{Y_i(J, x_i^W)}{u_i} \right\rfloor \right\}$$

Third, $Z(J;x_1^C, \ldots, x_n^C)$ indicates the number of sets formed from J releases of the standard multiple part job configuration having $x_i^J$, $i=1, \ldots, n$, chips of type i on the standard wafer (MPW). Specifically, $$Z(J; x_1^C, \ldots, x_n^C) = \min_i \left\{ \left\lfloor \frac{Y_i(J, x_i^C)}{u_i} \right\rfloor \right\}$$

For convenience, the following set yield approximation random variables, which are approximations for the number of sets formed, are introduced.

$$\tilde{Z}(x_1^J, \ldots, x_n^J) = \min_i \left( \frac{Y_i(x_i^J)}{u_i} \right),$$

$$\tilde{Z}(J; x_1^W, \ldots, x_n^W) = \min_i \left( \frac{Y_i(J, x_i^W)}{u_i} \right),$$

and $$\tilde{Z}(J; x_1^C, \ldots, x_n^C) = \min_i \left( \frac{Y_i(J, x_i^C)}{u_i} \right).$$

Observe that

-continued $$0 \leq \tilde{Z}(x_1^J, \ldots, x_n^J) - Z(x_1^J, \ldots x_n^J) < 1,$$

$$0 \leq \tilde{Z}(J; x_1^W, \ldots, x_n^W) - Z(J; x_1^W, \ldots x_n^W) < 1,$$

and $$0 \leq \tilde{Z}(J; x_1^C, \ldots, x_n^C) - Z(J; x_1^C, \ldots x_n^C) < 1.$$

Job Configuration for P1 Performance Measure and SPJ Scenario

The job configurer 110 configures jobs for the P1 performance measure and the SPJ scenario as follows. In the step 210 of FIG. 2, the parameter determiner 116 receives the appropriate parameters for the SPJ scenario. Specifically, it receives the demand for sets D, the usage counts $u_i$ of each of chip type, the number of wafers $W_i$ in a single part job of each chip type, the number of chip sites $K_i$ on a single part wafer of each chip type, and the desired serviceability $\delta$.

In the step 212, the mathematical optimization generator 118 generates a mathematical optimization for the input parameter structures 124. For the P1 performance measure of the SPJ scenario, the mathematical optimization is:

$$\text{Minimize} \sum_{i=1}^{n} x_i^J W_i \quad \text{(SPJ-P1)}$$

subject to a constraint (referred to as C1)

$$\text{Prob}(Z(x_1^J, \ldots, x_n^J) \geq D) \geq \delta \quad \text{(C1)}$$

In the step 214 of FIG. 2, the mathematical optimization reformulator 120 replaces the constraint with a lower bound as follows. The random variables $Y_i(x)_i^J$, $i=1, \ldots, n$, are independent because the jobs are independent. Therefore, C1 is replaced by the following lower bound (referred to as LB1):

$$\text{Prob}(Z(x_1^J, \ldots, x_n^J) \geq D) = \text{Prob}(Y_i(x_i^J) \geq D_i, \text{ for all } i)$$
$$= \prod_{i=1}^{n} \text{Prob}(Y_i(x_i^J) \geq D_i)$$

The reformulated mathematical optimization 128 (referred to as SPJ-P1') is thus $$\text{Minimize} \sum_{i=1}^{n} x_i^J W_i \quad \text{(SPJ-P1)}$$

subject to a constraint (referred to as C1')

$$\prod_{i=1}^{n} \text{Prob}(Y_i(x_i^J) \geq D_i) \geq \delta$$

Under the assumption that the random variables $Y_i(x_i^J)$ are normal, each factor in the constraint C1' is log concave in $x_i^J$. As a consequence the mathematical optimization SPJ-P1' becomes a separable convex mathematical optimization problem and can be efficiently solved by marginal allocation. (See B. Fox, "Discrete Optimization via marginal allocation, "*Management Science* 13:210–216 (1966), which is hereby incorporated by reference as if set forth in full below.) Note that $\text{Prob}(Z(x_1^J, \ldots, x_n^J) \geq D)$ can be computed exactly using the cumulative binomial, or can be approximated using the normal approximation to the binomial.

The formula for computing $\text{Prob}(Z(x_1^J, \ldots, x_n^J) \geq D)$ with the cumulative binomial is as follows.

$$Bin(n, N, p) = \binom{N}{n} p^n (1-p)^{N-n}$$

$$CumBin(n, N, p) = \sum_{k=n}^{N} \binom{N}{k} p^k (1-p)^{N-k}$$

$$\text{Prob}(Z(x_1^J, \ldots, x_n^J) \geq D) = \prod_{i=1}^{n} \text{Prob}(Y_i(x_i^J) \geq D_i)$$
$$= \prod_{i=1}^{n} \left[ \sum_{j=1}^{x_i^J} \sum_{k=1}^{jW_i} CumBin(D_i, kK_i, p_i^C)Bin(k, jW_i, p_i^W)Bin(j, x_i^J, p_i^J) \right] \quad \text{PROB1}$$

The above formula is referred to as PROB1.

Figure 3A:
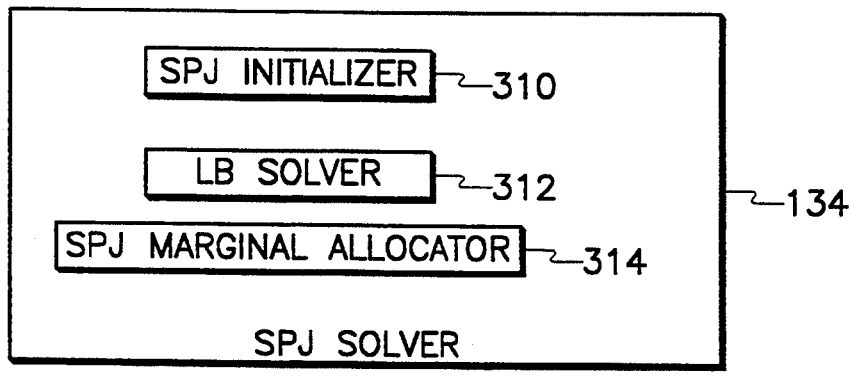
FIG. 3A is a block diagram of the structure of an single part job (SPJ) solver of a mathematical optimization solver of FIG. 1.

In the step 216, the mathematical optimization solver 122 computes the job configuration 132 for the P1 performance measure for the SPJ scenario. FIG. 3A is a block diagram which shows the structure of SPJ solver 134 of FIG. 1. Looking at FIG. 3A, the SPJ solver 134 is comprised of a SPJ initializer 310, a SPJ solver 312 and a SPJ marginal allocator 314.

FIG. 4 is a flowchart which shows the operation of the SPJ solver 134 in carrying out the step 216 of FIG. 2 of performing marginal allocation to compute the job configuration. Looking at FIG. 4, in a step 410 the SPJ initializer 310 initializes the decision variable values $x_i^J$ to feasible starting quantities. The feasible starting quantities of the decision variables are quantities which can be shown to be componentwise less than the ultimate quantities, that is, the quantities when a mathematical optimization in which it occurs is solved. In configuring jobs for the P1 performance measure and the SPJ scenario, the ultimate quantities are the decision variable values returned in a step 416 described below.

In a preferred embodiment, the SPJ initializer 310 carries out the initialization as follows.

$$x_i^J = \left\lceil \frac{\ln(1-\delta)}{\ln(1-p_i^J)} \right\rceil$$

This ensures that at least one job of chip type i survives (i.e., is manufactured without defect) with the probability δ. Note that performance of the SPJ marginal allocator 314 may be improved by initializing the decision variable values to greater values which still fall within the definition of feasible starting quantities. For example, the decision variable values could be initialized to the ground start ratio of jobs of each of the chip types.

In a step 412, the LB solver 312 computes a lower bound LB1 given the values of $X^J$ just computed. Specifically, it computes the probability that the desired number of each of sets survives. That is, $$LB1(X^J) = \prod_{i=1}^{n} Prob(Y_i(x_i^J) \geq D_i),$$

following PROB1.

In a step 414, the mathematical optimization solver 122 determines whether $LB1(X^J)$ is greater than or equal to the desired serviceability level δ. If so, then in a step 416, the mathematical optimization solver 122 returns the decision variables $X^J$ as well as the lower bounds calculated for $X^J$. Otherwise, processing is as follows.

In steps 418 and 420, the SPJ marginal allocator 314 selects a chip type of which one more job should be produced. This chip type is the one which, when manufactured in one additional job, most efficiently increases the probability of meeting the desired serviceability level δ. Specifically, in the step 418, the SPW marginal allocator 314 computes marginal values for all i as follows:

$$\text{marginal}(i) = \frac{\ln\left(\frac{LB1(X^j + e_i)}{LB1(X^J)}\right)}{W_i}$$

where $e_i = (0, \ldots 0, 1, 0, 0 \ldots 0)$ is a unit vector with a 1 in the $i^{th}$ component.

In the step 420, the SPJ marginal allocator 314 selects the chip type which corresponds to the largest of the marginal values.

In a step 422, the SPJ solver 134 adds an additional job of the selected type to the decision variable $X^J$. Flow of control of the SPJ solver 134 then returns to the step 412 to determine whether the desired serviceability level δ will be satisfied for the values of $X^J$.

Job Configuration for P2 Performance Measure and SPJ Scenario

The job configurer 110 configures jobs for the P2 performance measure and the SPJ scenario as follows. In the step 210 of FIG. 2, the parameter determiner 116 receives the appropriate parameters for the SPJ scenario. Specifically, it receives D (the demand for sets), u (the usage counts $u_i$ of each chip type), $W_i$ (the number of wafers in a single part job of each chip type), and $K_i$ (the number of chip sites on a single part wafer of each chip type).

In the step 212, the mathematical optimization generator 118 generates a mathematical optimization for the input parameter structures 124. For the P2 performance measure of the SPJ scenario, the mathematical optimization (referred to as SPJ_P2') would be:

$$\text{Minimize } \sum_{i=1}^{n} x_i^J W_i \quad \text{(SPJ-P2')}$$

subject to a constraint $$E\widetilde{Z}(x_1^J, \ldots, x_n^J) \geq D \quad \text{(C2)}$$

The above constraint is referred to as C2.

In the step 214 of FIG. 2, the mathematical optimization reformulator 120 replaces the constraint with a lower bound as follows. Let $(x)^+$ denote $\max\{0, x\}$. The following inequality is based on a similar inequality originally introduced by Lai and Robbins. (See Lai and Robbins, "Maximally dependent random variables," Proc. Natl. Acad. Sci. 73 (2) :286—288 (Feb. 1976), which is hereby incorporated by reference as if set forth in full below.) For any a, $$E\widetilde{Z}(x_1^J, \ldots, x_n^J) \geq a - \sum_{i=1}^{n} E(a - Y_i(x_i^J)/u_i)^+$$

This lower bound is referred to as LB2. Note that LB2 depends on the marginal $Y_i(x_i^J)$. The constant "a" becomes part of the decision variable so as to obtain a tight lower bound. Furthermore, it can be shown that the lower bound LB2 is (jointly) concave in (a, $x_1^J, \ldots, x_n^J$).

The reformulated mathematical optimization 128 (referred to as SPJ-P2') is thus $$\text{Minimize } \sum_{i=1}^{n} x_i^J W_i$$

subject to $$a - \sum_{i=1}^{n} E(a - Y_i(x_i^J)/u_i)^+ \geq D.$$

In the step 216, the SPJ solver 134 solves the reformulated mathematical optimization 128 so as to compute the job configuration 132 for the P2 performance measure of the SPJ scenario.

The methods for solving the P2 performance measures of the reformulated SPJ, SPW and MPW reformulated mathematical optimizations 128 are based on the Lai-Robbins lower bound. Let the values of $Y_i$ for all i be normal random variables with means $\mu_i$ and variances $\sigma_i^2$, respectively. The Lai-Robbins based lower bound can be explicitly computed as follows. For any a, where, $$a - \sum_{i=1}^{n} E(a - Y_i)^+ =$$

$$a - a \sum_{i=1}^{n} \Phi(z_i) + \sum_{i=1}^{n} (\mu_i \Phi(z_i) - \sigma_i \phi(z_i)) := LR\_LB(a, \mu, \sigma^2),$$

$$\mu = (\mu_1, \ldots, \mu_n)$$
$$\sigma^2 = (\sigma_1^2, \ldots, \sigma_n^2)$$

$$z_i = \frac{a - \mu_i}{\sigma_i}$$

-continued $$\phi(t) = \frac{1}{\sqrt{2\pi}} e^{-t^2/2}$$

$$\Phi(t) = \int_{-\infty}^{t} \phi(s) ds$$

The greatest Lai-Robbins lower bound (referred to as MAXLB) is $$\sum_{i=1}^{n} (\mu_i \Phi(z_i) - \sigma_i \phi(z_i)), \quad \text{(MAX-LB)}$$

and this is achieved for the a that satisfies $$\sum_{i=1}^{n} \Phi(z_i) = 1. \quad \text{(LB-SOLN)}$$

For a given $\mu$ and $\delta$, LB-SOLN can be solved using a bisection root-finding routine.

In solving the P2 performance measure of the SPJ mathematical optimization, it is assumed that the random variables $Y_i(x_i^J)/u_i$, $i=1, \ldots, n$, are normal. The means, $\mu_i(x_i^J)$, and variances, $\sigma_i^2(x_i^J)$, are computed as functions of $(x_i^J)$ as follows:

$$\mu_i(x_i^J) = x_i^J W_i K_i p_i^J p_i^W p_i^C / u_i$$
$$\sigma_i^2(x_i^J) = \mu_i(x_i^J)(p_i^C(1 - p_i^W)K_i + (1 - p_i^C) + p_i^W p_i^C(1 - p_i^J)W_i K_i)/u_i$$
Let $\mu(x^J) = (\mu_1(x_1^J), \ldots, \mu_n(x_n^J))$ and
$$\sigma_1^2(X_1^J) = (\sigma^2(X^J), \ldots, \sigma_n^2(x_n^J)).$$

Setting a=D, the reformulated mathematical optimization SPJ-P2' becomes a separable convex mathematical optimization problem and can be solved by marginal allocation.

Figure 9:
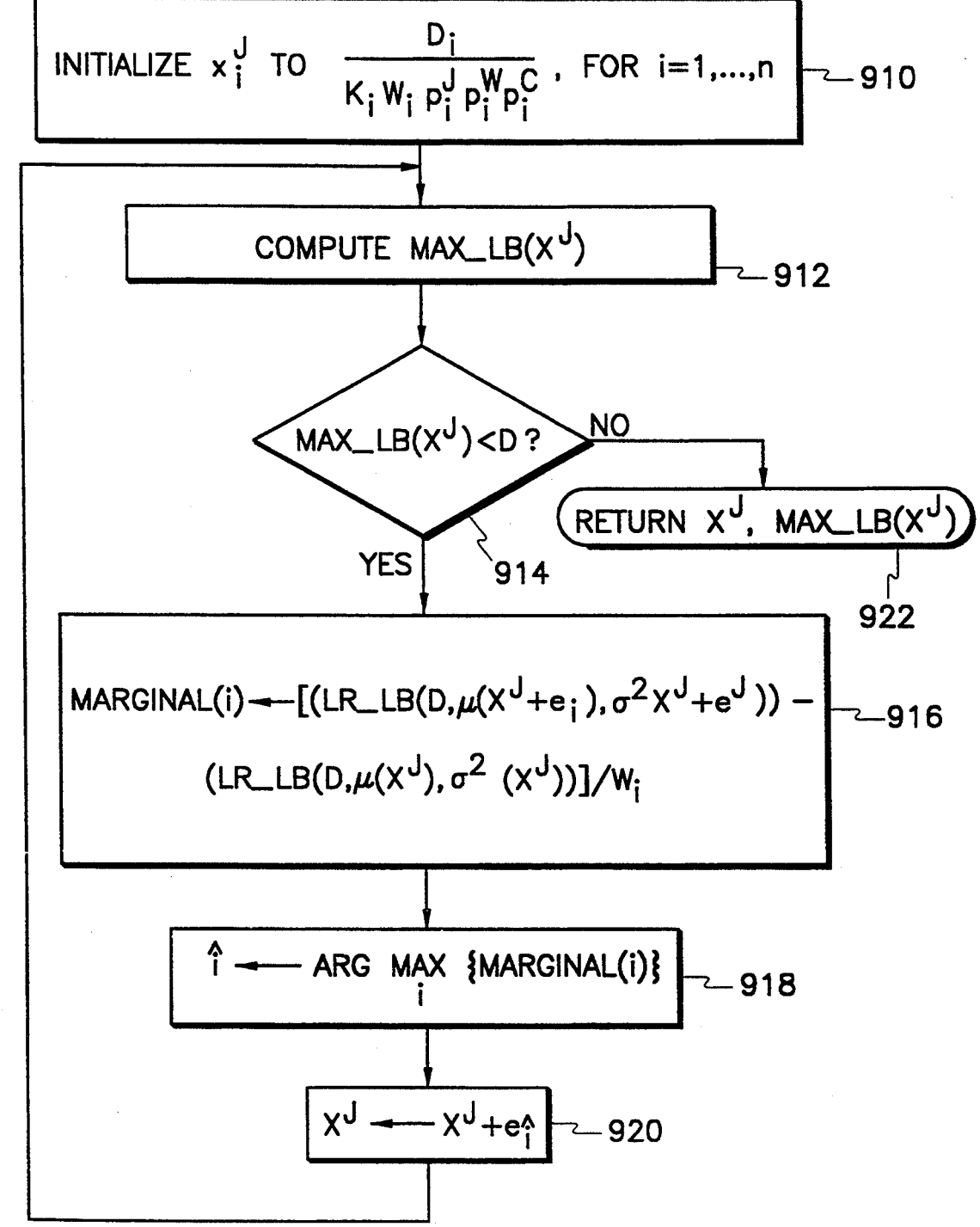
FIG. 9 is a flowchart which illustrates the operation of the SPJ solver of FIG. 3A in computing an expectation (P2) formulation.

FIG. 9 shows a flowchart of the operation of the SPJ solver 134 in carrying out the step 216 of computing the job configuration 132 for the P2 performance measure of the SPJ scenario. Looking at FIG. 9, in a step 910, the SPJ initializer 310 initializes $X^J$ to feasible starting quantities, i.e., quantities less than the ultimate quantities of $X^J$ returned in a step 922 described below.

In a preferred embodiment, the SPJ initializer 310 sets $x^{iJ}$, for each i, i=1, ..., n, as follows:

$$x_i^J = \left\lceil \frac{D_i}{K_i W_i p_i^J p_i^W p_i^C} \right\rceil$$

Note that performance of the SPJ marginal allocator 314 may be improved by initializing the decision variable values to greater values which still fall within the definition of feasible starting quantities. For example, the decision variable values could be initialized to the ground start ratio of jobs of each of the chip types.

Next, in a step 912, the SPJ solver 312 computes the maximum LB (MAX-LB) evaluated at $(X^J)$. This value is referred to as MAX-LB$(X^J)$.

In a step 914, the SPJ solver 134 determines whether the value of MAX-LB$(X^J)$ computed in the step 912 is less than the demanded number of chip sets. If so, then steps 916, 918 and 920 are carried out next.

In the steps 916-920, the SPJ marginal allocator 314 selects a chip type of which one more job should be produced. Specifically, in the step 916, the SPJ marginal allocator 314 computes marginal values for all i as follows:

marginal (i)=(LR_LB(D,$\mu(X^J+e_i)$, $\sigma^2(X^J+e_i)$)− LR_LB(D,$\mu(X^J)$, $\sigma^2(X^J)$))/W$_i$ In the step 918, the SPJ marginal allocator 314 selects the chip type which corresponds to the largest of the marginal values. In a step 920, the SPJ solver 134 adds an additional job of the selected type to $X^J$. Flow of control of the SPJ solver 134 then returns to the step 912 to determine whether the expected number of sets produced is still less than the demanded number of sets. Once the expected number is at least as great as the demanded number, then in a step 922 the SPJ solver 134 returns the values of $X^J$ and MAX-LB$(X^J)$.

Job Configuration for P1 Performance Measure and SPW Scenario

The job configurer 110 configures jobs for the P1 performance measure and the SPW configuration as follows. In the step 210 of FIG. 2, the parameter determiner 116 of FIG. 1 receives the appropriate input parameters for the SPW scenario. Specifically, it receives D (the demand for sets); $u_i$ (the usage counts); W (the number of wafers in the standard multiple part job); $K_i$ (the number of chip sites on a single part wafer of each chip type); $p^J$ (the probability that the standard multiple part job is good); $p_i^W$ (the probability that the single part wafer of type i is good given the job it is in is good); $p_i^C$ (the probability that a chip of type i is good given that the job it is in is good and the wafer it is on is good); and $\delta$ (the desired serviceability).

In the step 212, the mathematical optimization generator 118 constructs the mathematical optimization for the input parameter structures 124. For the P1 performance measure of the SPW scenario, the mathematical optimization would be:

Minimize J subject, to the contraint (referred to as C3)

$$\text{Prob}(Z(J;x_1^W, \ldots, x_n^W) \geq D) \geq \delta \quad \text{(C3)}$$

$$\sum_{i=1}^{n} x_i^W = W$$

The constraint is referred to as C3.

In the step 214, the mathematical optimization reformulator 120 replaces the constraint with a lower bound. The random variables $Y_i(J, x_i^W)$, $i=1, \ldots, n$, are associated. Associated random variables are described in Y. Tong, *Probability Inequalities in Multivariate Distributions*, Academic Press (1980). The latter document is hereby incorporated by reference as if set forth in full below. Because the random variables are associated, the mathematical optimization reformulator 120 replaces the constraint C3 with the following lower bound (referred to as LB3).

$$\text{Prob}(Z(J;x_1^W, \ldots, x_n^W) \geq D) = \text{Prob}(Y_i(J,x_i^W) \geq D_i,$$

$$\text{for all} \geq \prod_{i=1}^{n} \text{Prob}(Y_i(J,x_i^W) \geq D_i)$$

The reformulated mathematical optimization 128 (referred to as SPW-P1') is thus

Minimize J subject to a lower bound (referred to as C3')

$$\prod_{i=1}^{n} Prob(Y_i(J, x_i^W) \geq D_i) \geq \delta$$

$$\sum_{i=1}^{n} x_i^W = W$$

In the step 216 of FIG. 2, the SPW solver 136 computes the job configuration 132 for the P1 performance measure of the SPW scenario. It does so essentially by using an iterative search on J (the number of standard multiple part jobs in the configuration) in combination with a marginal allocation on the number of wafers of each single part wafer type in the standard job configuration.

Figure 3B:
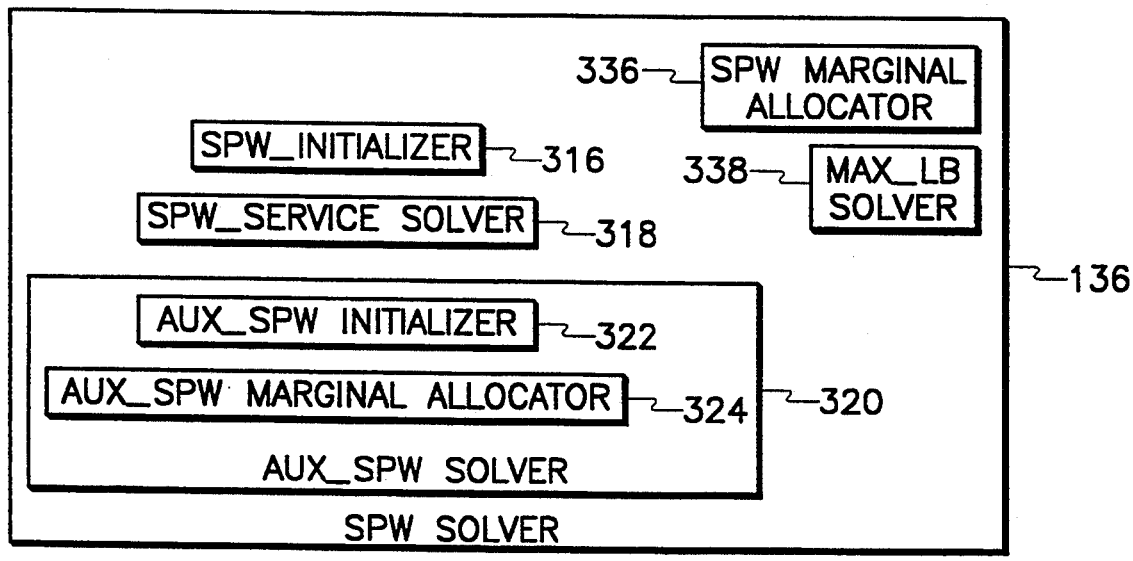
FIG. 3B is a block diagram of the structure of a single part wafer (SPW) solver of the mathematical optimization solver of FIG. 1.

FIG. 3B is a block diagram which shows the structure of the SPW solver 136. Looking at FIG. 3B, the SPW solver 16 comprises a SPW_initializer 316, a SPW_service determiner 318, and an AUX_SPW solver 320. The AUX_SPW solver 320, in turn, comprises an AUX_initializer 322 and an AUX_SPW marginal allocator 324. The SPW solver 136 also comprises an SPW marginal allocator 336 and a MAX-LB solver 338, which are used to compute the job configuration 132 for the P2 performance measure of the SPW scenario.

Figure 5:
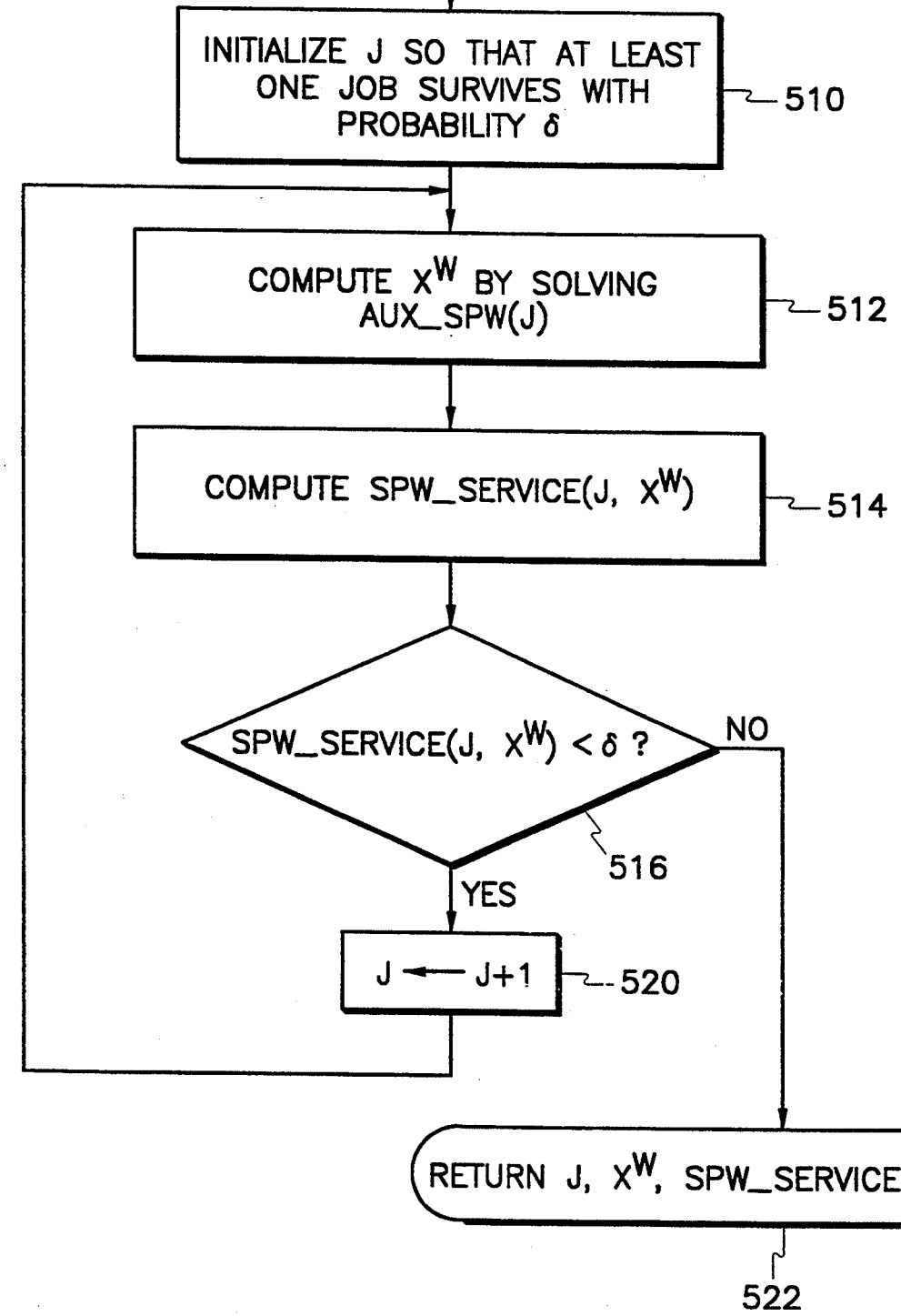
FIG. 5 is a flowchart which illustrates the operation of a SPW solver of FIG. 3B in computing a probability (P1) formulation measure.

FIG. 5 is a flowchart which illustrates the operation of the modules of the SPW solver 136 in carrying out the step 216 of solving the reformulated mathematical optimization. In a step 510, the SPW initializer 316 initializes J (the number of standard multiple part jobs in the configuration) to a feasible starting quantity. The feasible starting quantity of J is a quantity which can be shown to be less than the ultimate quantity of J, that is, the quantity of J when a mathematical optimization in which it occurs is solved. In configuring jobs for the P1 performance measure and the SPW scenario, the ultimate quantity is that returned in a step 522 described below.

In a preferred embodiment, the SPW initializer 316 initializes J as follows:

$$J = \left\lceil \frac{\ln(1-\delta)}{\ln(1-p^J)} \right\rceil$$

This ensures that at least one job survives with probability $\delta$. Note that performance of the SPW solver 136 may be improved by initializing J to a greater quantity which still falls within the definition of a feasible starting quantity.

The AUX_SPW solver 320 then constructs an auxiliary SPW mathematical optimization. In a step 512, the AUX_SPW solver 320 solves the auxiliary SPW mathematical optimization with J jobs to determine, for a given value of J, the values of $x_i^W$ (the number of single part wafers of chip type i in the standard multiple part job configuration) for all i. The auxiliary program is:

$$\text{Maximize} \prod_{i=1}^{n} Prob(Y_i(J, x_i^W) \geq D_i)$$

subject to a constraint $$\sum_{i=1}^{n} x_i^W = W$$

Figure 6:
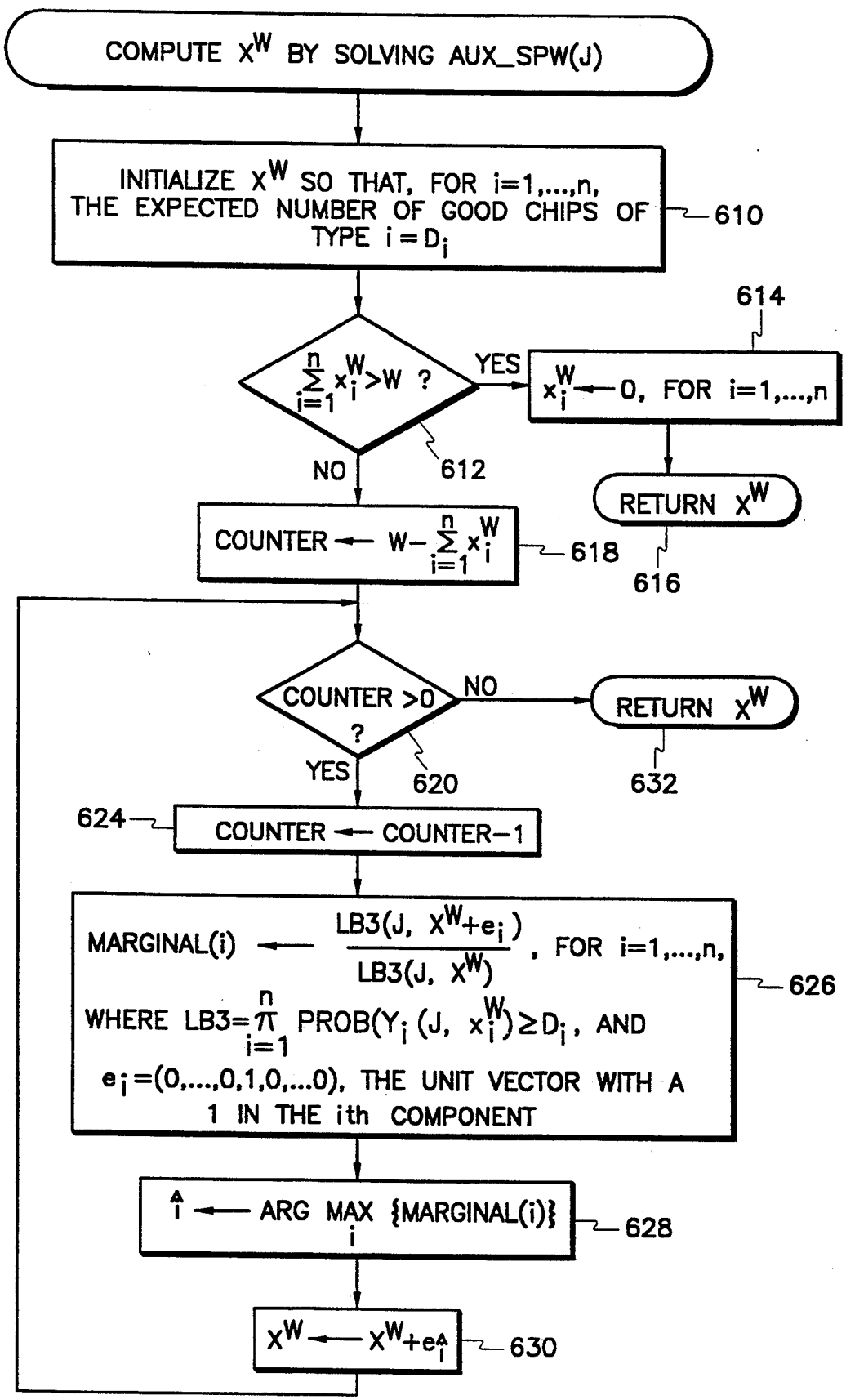
FIG. 6 is a flowchart which illustrates the operation of an auxiliary SPW (aux—SPW) solver of the SPW solver of FIG. 3B.

The structure and operation of the AUX_SPW solver 320 is described in greater detail in FIG. 6 and the accompanying text.

In a step 514, the SPW_service solver 318 solves the SPW_service program given the values of J and $X^W$ just computed. SPW_service (J, $X^W$) is the actual service achieved. That is, SPW_service (J, $x^W$) = Prob $(Z(J; x_1^W, \ldots, X_n^W) \geq D)$. Under the assumption that the random variables $Y_i(J, x_i^W)$ are normal each factor in the objective function of AUX-SPW is log concave in $x_i^W$. As a consequence, AUX-SPW becomes a separable convex programming problem and can be solved optimally by marginal allocation. The formula for the actual service achieved is as follows:

$$Bin(n, N, p) = \binom{N}{n} p^n (1-p)^{N-n}$$

$$CumBin(n, N, p) = \sum_{k=n}^{N} \binom{N}{k} p^k (1-p)^{N-k}$$

$$Prob(Z(J; x_1^W, \ldots, X_n^W) \geq D) =$$

$$\sum_{j=1}^{J} \pi \prod_{i=1}^{n} \left[ \sum_{k=1}^{jx_i^W} CumBin(D_i, kK_i, p_i^f) Bin(k, jx_i^W, p_i^W) \right] Bin(j, J, p^J)$$

In a step 516, the SPW solver 136 determines whether the value of SPW_service (J, $X^W$) just determined is less than the desired serviceability $\delta$. If so, then the desired serviceability $\delta$ cannot be met with J jobs. Accordingly, in step 520, J (the number of jobs) is incremented. Flow of control of the SPW solver 136 then returns to the step 512 so that new values can be computed for $X^W$ with J jobs.

Once SPW_service(J, $X^W$) is greater than or equal to $\delta$, the desired serviceability has been attained. Accordingly, in a step 522, the SPW solver 136 returns J, the values of $X^W$ and SPW_service(J, $X^W$).

FIG. 6 is a flowchart which illustrates the operation of the AUX_SPW solver 320 in carrying out the step 512 of computing $X^W$ by solving AUX_SPW given J. Looking at FIG. 6, in a step 610 the AUX_SPW initializer 322 initializes the decision variable values to feasible starting quantities. For the auxiliary SPW program, as well as an auxiliary MPW (described below), feasible starting quantities are quantities which can be shown to be componentwise less than the ultimate quantities, where the ultimate quantities are those when a mathematical optimization in which the decision variables occur is solved, given J. In configuring jobs for the P1 performance measure and the SPW scenario, the ultimate quantities are the decision variable values returned in a step 632 described below.

In a preferred embodiment, the AUX_SPW initializer 322 initializes the decision variables as follows:

$$x_i^W = \left\lceil \frac{D_i}{JK_i p^J p_i^W p^f} \right\rceil$$

Roughly speaking, these values of $X^W$ provide a level of serviceability for each chip type of approximately 0.5. For most problems of interest, the desired level of serviceability is much greater than 0.5. Accordingly, the initial values can be shown to be componentwise less than the ultimate solution to the decision variable values.

Note that performance of the AUX_SPW solver 320 may be improved by initializing the decision variable values to greater values which still fall within the definition of feasible starting quantities. For example, the decision variable values could be initialized to the ground start ratio of wafers of each of the chip types.

In a step 612, the AUX_SPW solver 320 determines whether the sum of the values $x_1^W, \ldots, x_n^W$ exceeds W. (As explained, W is the number of wafers in the standard multiple part job. W is also referred to as the required number of wafers.) If so, the auxiliary program cannot be solved with J jobs. Accordingly, in a step 614 the AUX_SPW solver 320 sets $X_i^W$ to 0, for all i. In a step 616, the values of $X^W$ are returned to the SPW solver 136. The SPW solver 136 will then determine (in the step 516) that SPW_service(J, $X^W$) is less than $\delta$ and increment the number of jobs (in the step 520).

If on the other hand, the sum of the values $x_1^W, \ldots, x_n^W$ is not greater than W, processing is as follows. In a step 618, the AUX_SPW solver 320 initializes a counter to W (the sum of the values $x_1^W, \ldots, x_n^W$). The counter enables the AUX_SPW solver 320 to repeat steps 620 through 630 the appropriate number of times.

In a step 620, the AUX_SPW 320 determines whether these steps have been repeated the appropriate number of times. While the counter is greater than zero, processing is as follows.

In a step 624 the counter is decremented by one. The aux-SPW marginal allocator 324 then carries out the steps 626-630 to perform marginal allocation on the lower bound LB3 (described above). Specifically, in the step 626 it sets, for all i, values of marginal(i) to:

$$\frac{LB3(J,X^W + e_i)}{LB3(J,X^W)}$$

In the step 628, the AUX_SPW marginal allocator 324 selects the chip type which corresponds to the greatest value of marginal(i). In the step 630, the AUX_SPW solver 320 increments the number of wafers of the selected chip type. Flow of control then returns to the step 620. Once the counter indicates that the steps 620 through 630 have been executed the appropriate number of times, then in a step 632 the values of $X^W$ are returned to the SPW solver 136.

Job Configuration for P2 Performance Measure and SPW Scenario Program

The job configurer 110 configures jobs for the P2 performance measure and the SPJ scenario as follows. In the step 210 of FIG. 2, the parameter determiner 116 receives the appropriate input parameters 112. Specifically, it receives D (demand for sets); $u_i$ (the usage counts); W (the number of wafers in the standard multiple part job; $K_i$ (number of chip sites on a single part wafer on each chip type); $p^J$ (the probability that the standard multiple part job is good); $p_i^W$ (the probability that the single-part wafer of type i is good given the job it is in is good); and $p_i^C$ (the probability that a chip of type i is good given that the job it is in is good and the wafer it is on is good).

In the step 212, the mathematical optimization generator 118 generates a mathematical optimization for the input parameter structures 124. For the P2 performance measure of the SPJ scenario, the mathematical optimization would be:

Minimize J subject to a constraint (referred to as C4)

$$EZ(J;x_1^W, \ldots, x_n^W) \geq D \quad (C4)$$

$$\sum_{i=1}^{n} x_i^W = W$$

In the step 214 of FIG. 2, the mathematical optimization reformulator 120 replaces the constraint with a lower bound as follows.

$$E\tilde{Z}(J;x_1^W, \ldots, x_n^W) \geq a - \sum_{i=1}^{n} E(a - Y_i(J,x_i^W)/u_i)^+$$

The above lower bound is referred to as LB4. LB4 depends on the marginal $Y_i(J,x_i^W)$. The constant "a" becomes part of the decision variable so as to obtain a tight lower bound. Furthermore, it can be shown that the lower bound LB4 is (jointly) concave in $(a,J,x_1^W, \ldots, x_n^W)$.

The reformulated mathematical optimization 128 for the P2 performance measure of the SPW configuration (referred to as SPW-P2') is thus Minimize J subject to $$a - \sum_{i=1}^{n} E(a - Y_i(J,x_i^W)/u_i)^+ \geq D$$

$$\sum_{i=1}^{n} x_i^W = W$$

In the step 216, the SPW solver 136 solves SPW-P2' using the Lai-Robbins lower bound. Computation of the latter is described in the section "Job Configuration for P2 Performance Measure and SPJ Scenario."

In solving SPW-P2', it is assumed that for a given number of jobs J the random variables $Y_i(J,x_i^W)/u_i$, $i=1, \ldots, n$, are normal. The means $\mu_i(J,x_i^W)$, and variances, $\sigma_i^2(J,x_i^W)$, are computed as functions of $x_i^W$ and J as follows:

$$\mu_i(J,x_i^W) = Jx_i^W K_i p^J p_i^W p_i^C/u_i$$

$$\sigma_i^2(J,x_i^W) = \mu_i(J,x_i^W)(p_i^C(1-p_i^W)K_i + (1-p_i^C) + p_i^W p_i^C(1-p^J)x_i^W K_i)/u_i$$

Let $\mu(J,X^W) = (\mu_1(J,x_1^W), \ldots, \mu_n(J,x_n^W))$ and $\sigma^2(J,X^W) = (\sigma_1^2(J,x_1^W), \ldots, \sigma_n^2(J,x_n^W))$. Let MAX_LB$(J,X^W)$ be the maximum LB (MAX_LB) evaluated at $(J,X^W)$. Setting a=D, and for a fixed value of J, SPJ-P2' becomes a separable convex programming problem and can be solved by marginal allocation.

Figure 10:
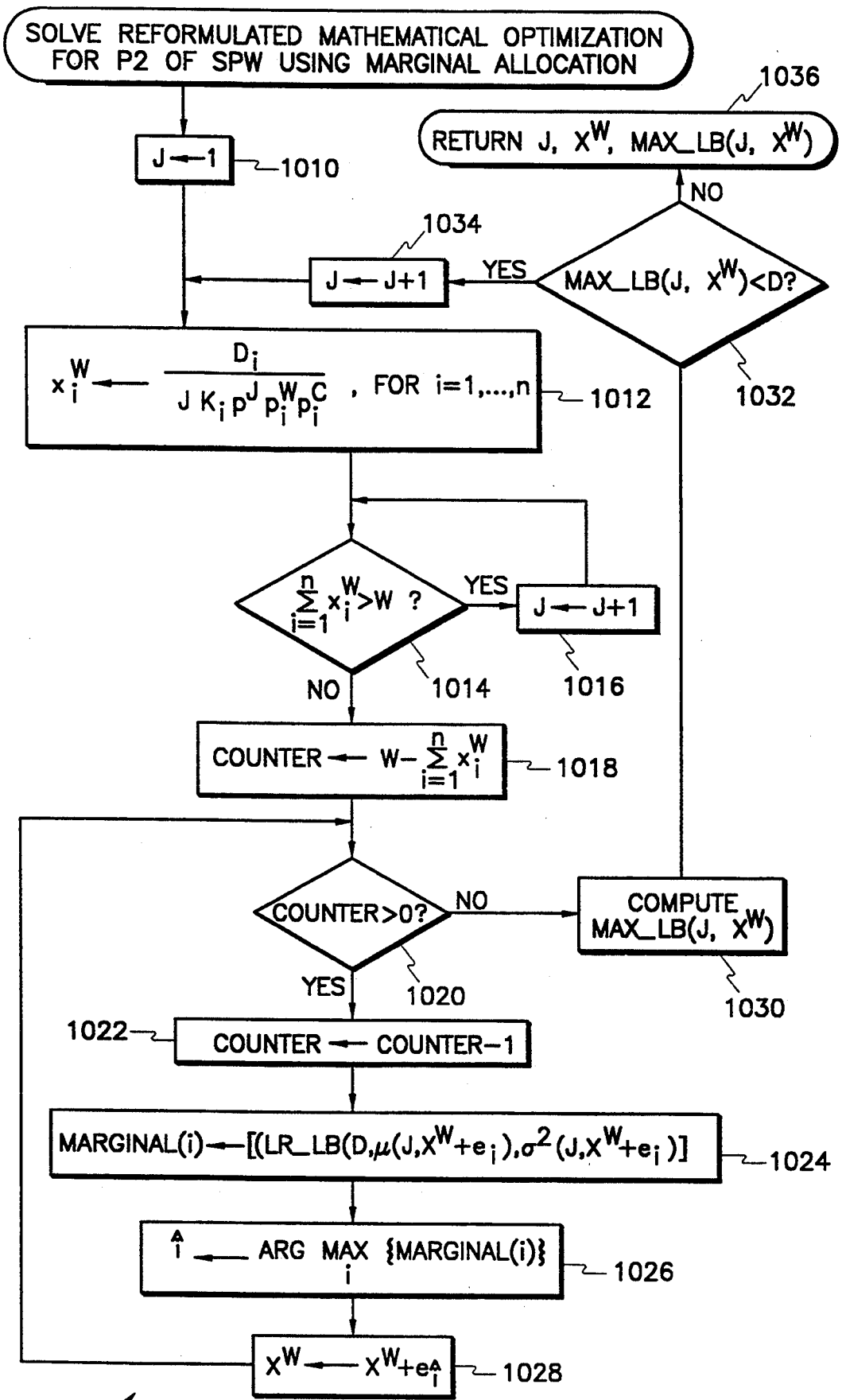
FIG. 10 is a flowchart which illustrates the operation of the SPW solver of FIG. 3B in computing a P2 formulation.

FIG. 10 is a flowchart which shows the operation of the SPW solver 136 in solving the P2 performance measure of the reformulated SPW mathematical optimization. Looking at FIG. 10, in a step 1010 the SPW initializer 316 initializes J (the number of jobs) to a feasible starting quantity. In configuring jobs for the P2 performance measure and the SPW scenario, the feasible starting quantity is the quantity of jobs required in the ultimate solution to the reformulated mathematical optimization, i.e., the quantity of jobs returned in a step 1036 described below.

In a preferred embodiment, the SPW initializer 316 initializes J to 1. Note that performance of the SPW solver 136 may be improved by initializing the decision variable values to greater values which still fall within the definition of feasible starting quantities.

In a step 1012, the SPW initializer 316 initializes $X^W$ to a feasible starting quantity of single part wafers of each chip type. In a preferred embodiment, the SPW initializer 316 sets the values for all i of $X^W$ as follows.

$$x_i^W = \left\lceil \frac{D_i}{JK_{ip}J_{p_i}W_{p_i}C} \right\rceil$$

Note that performance of the SPW marginal allocator 336 may be improved by initializing the decision variable values to greater values which still fall within the definition of feasible starting quantities. For example, the decision variable values could be initialized to the ground start ratio of wafers of each of the chip types.

In a step 1014, the SPW solver 136 determines whether the sum of $x_i^W$ over all i is greater than W (the number of wafers in a standard multiple part job). If so, then the mathematical optimization cannot be solved for the current value of J. Accordingly, in a step 1016, J is incremented by 1. The above procedure is repeated until a possible starting point is obtained.

Steps 1018, 1020 and 1022 are then carried out to facilitate executing steps 1024–1028 the appropriate number of times. Specifically, in the step 1018 the SPW solver 135 sets a counter value to the amount by which W exceeds the sum of the values of $X^W$.

In a step 1020, the SPW solver 136 determines whether the value of the counter is greater than 0. If so, then the steps 1024–1028 have not yet executed the desired number of times. In that case, the value of the counter is decremented in a step 1022, and the steps 1024–1028 are carried out as follows.

In the step 1024, the SPW marginal allocator 336 computes, for all i, the Lai-Robbins lower bound LR_LB $(D, \mu(J, X^W+e_i), \sigma^2(J,X^W+e_i))$. In the step 1026, the SPW marginal allocator 336 selects the chip type for which the Lai-Robbins lower bound is greatest.

In the step 1028, the SPW solver 136 increments the number of wafers of the selected chip type in $X^W$. Flow of control then returns to the step 1020. Once the value of the counter is zero, then in a step 1030 the MAX-LB solver 338 of the SPW solver 136 computes MAX-LB $(J, X^W)$. That is, it computes $$\sum_{i=1}^{n} (\mu_i \Phi(z_i) - \sigma_i \phi(z_i)) \qquad \text{(MAX-LB)}$$

In a step 1032, the SPW solver 136 determines whether MAX-LB $(J, X^W)$ is less than D (the demanded number of chip sets). If so, then in a step 1034 the SPW solver 136 increments J, and flow of control returns to the step 1012 to recompute $X^W$ and MAX-LB $(J, X^W)$.

Once MAX-LB $(J, X^W)$ is greater than or equal to D, then in a step 1036 the SPW solver 136 returns J, $X^W$ and MAX-LB $(J, X^W)$ to the SPW solver 136.

Job Configuration for P1 Performance Measure and MPW Scenario

The job configurer 110 configures jobs for the P1 performance measure and the SPW configuration as follows. In the step 210 of FIG. 2, the parameter determiner 116 of FIG. 1 receives the appropriate input parameters for MPW scenario. Specifically it receives D (the demand for sets), $u_i$ (the usage counts), W (the number of wafers in the standard multiple part job), K (the number of chip sites on a standard multiple part wafer), $p^J$ (the probability that the standard multiple part job is good), $p^W$ (the probability that the standard multiple part wafer is good given the job it is in is good) $p_i^C$ (the probability that a chip of type i is good given that the job it is in is good and the wafer it is on is good), and δ (the desired serviceability).

In the step 212, the mathematical optimization generator 118 generates the mathematical optimization for the input parameter structures 124. For the P1 performance measure of the MPW scenario, the mathematical optimization would be:

Minimize J subject to the constraint $$Prob(Z(j; x_1^C, \ldots, x_n^C) \geq D) \geq \delta \qquad \text{(C5)}$$

$$\sum_{i=1}^{n} x_i^C = K$$

The constraint is referred to as C5.

In the step 214, the mathematical optimization reformulator 120 replaces the constraint with a lower bound. For the P1 performance measure of the MPW scenario, the random variables $Y_i(J, x_i^C)$, $i=1, \ldots, n$ are associated. Accordingly, the mathematical optimization reformulator 120 replaces the constraint C5 with the following lower bound (referred to as LB5).

$$Prob(Z(J; x_1^C, \ldots, x_n^C) \geq D) = Prob(Y_i(J, x_i^C) \geq D_i, \text{ for all } i) \geq$$

$$\prod_{i=1}^{n} Prob(Y_i(J, x_i^C) \geq D_i)$$

The reformulated mathematical optimization 128 (referred to as MPW-P1') is thus Minimize J subject to a lower bound (referred to as C4')

$$\prod_{i=1}^{n} Prob(Y_i(J, x_i^C) \geq D_i) \geq \delta$$

$$\sum_{i=1}^{n} x_i^C = K$$

Figure 3C:
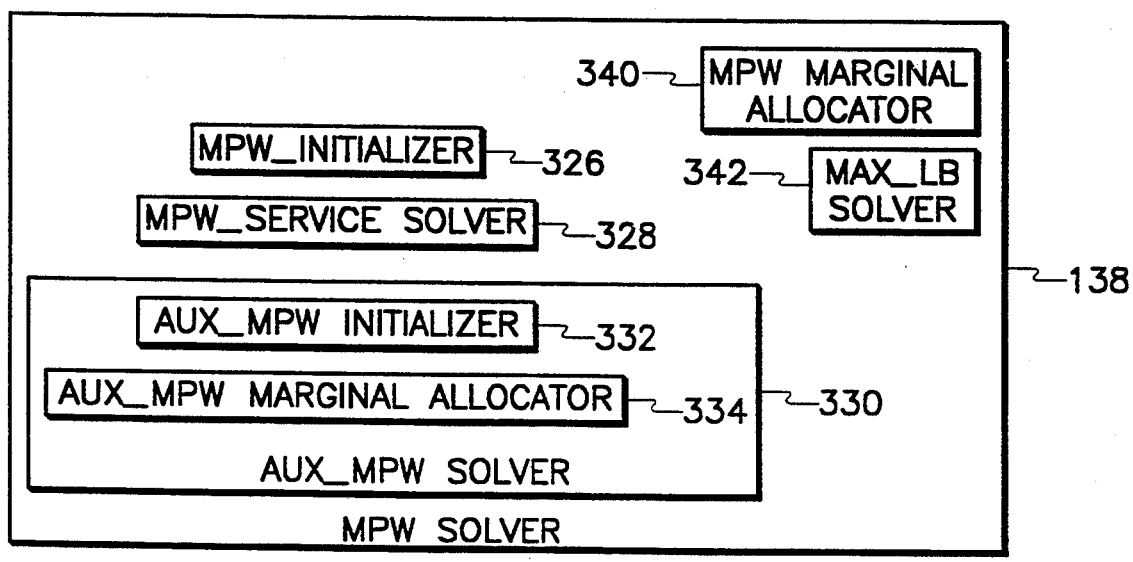
FIG. 3C is a block diagram of the structure of a multiple part wafer (MPW) solver of the mathematical optimization solver of FIG. 1.

In the step 216 of FIG. 2, the MPW solver 138 computes the job configuration 132 for the P1 performance measure of the MPW scenario. FIG. 3C shows the detailed structure of the MPW solver 138. The MPW solver 138 is comprised of an MPW initializer 326, an MPW service solver 328 and an AUX_MPW solver 330. The AUX_MPW solver is in turn comprised of an AUX_MPW initializer 332 and an AUX_MPW solver 334. The MPW solver 138 further comprises a MPW marginal allocation 340 and a MAX_LB solver 342. The latter two modules are used to compute the job configuration 132 for the P2 performance measure of the MPW scenario.

Figure 7:
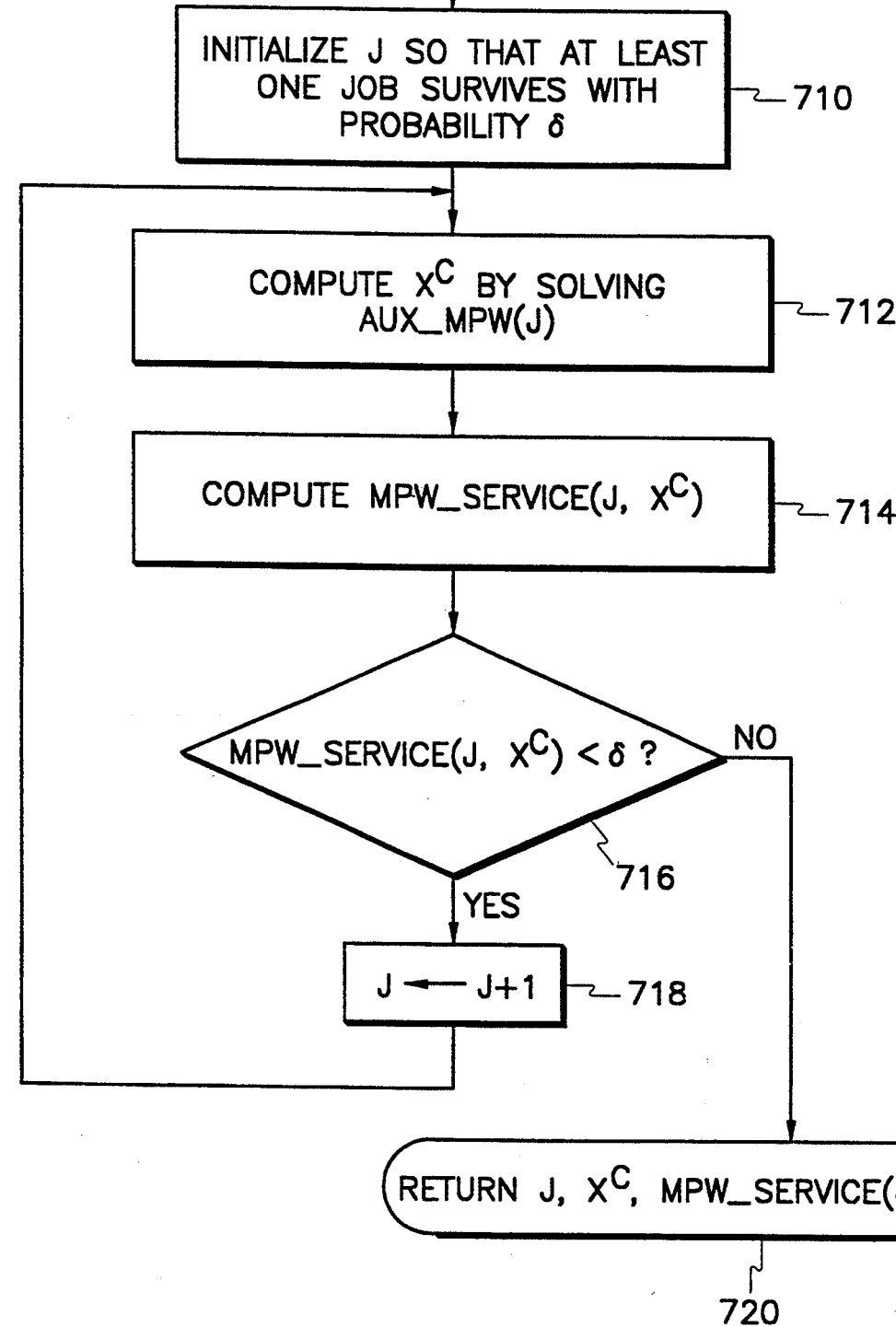
FIG. 7 is a flowchart which illustrates the operation of a MPW solver of FIG. 3C in computing a P1 formulation measure.

FIG. 7 is a flowchart which shows the operation of the modules of the MPW solver 138 in carrying out the step 216 of FIG. 2 of solving the reformulated program for MPW. In a step 710 of FIG. 7, the MPW initializer 326 initializes J (the number of jobs) to a feasible starting quantity. In configuring jobs for the P1 performance measure and the MPW scenario, the feasible starting quantity is the quantity of jobs required in the ultimate solution to the reformulated mathematical optimization, i.e., the quantity of jobs returned in a step 720 described below.

In a preferred embodiment, the MPW initializer 326 initializes J as follows:

$$J = \left\lceil \frac{\ln(1 - \delta)}{\ln(1 - p^J)} \right\rceil$$

This assures that at least one job will survives with probability $\delta$. Note that performance of the MPW solver 138 may be improved by initializing J to a greater value which still falls within the definition of a feasible starting quantity.

In a step 712, the AUX_MPW solver 330 computes, for all i, $X^C$ ( the number of chips of each type on the standard multiple part wafer) by solving a program AUX_MPW given J. The structure and operation of the AUX_MPW solver 330 are described in greater detail in FIG. 8 and the accompanying text.

In a step 714, the MPW_service solver 328 computes the serviceability achieved given the values of J and $X^C$ just computed. That is, it computes MPW service(J, $X^C$), where MPW_service(J $X^C$)=Prob(Z(J; $x_1^C$, ..., $x_n^C$)≧D). Under the assumption that the random variables $Y_i(J, x_i^C)$ are normal, each factor in the objective function of AUX-MPW is log concave in $x_i^C$. As a consequence, AUX-MPW becomes a separable convex programming problem and can be solved optimally by marginal allocation. The formula for the actual service achieved is as follows:

$$Bin(n, N, p) = \binom{N}{n} p^n (1 - p)^{N-n}$$

$$CumBin(n, N, p) = \sum_{k=n}^{N} \binom{N}{k} p^k (1 - p)^{N-k}$$

$$Prob(Z(J; x_1^C, \ldots, x_n^C) \geq D) =$$

$$\sum_{j=1}^{J} \sum_{k=1}^{jW} \left[ \prod_{i=1}^{n} CumBin(D_i, kx_i^C, p_i^C) \right] Bin(k, jW, p^W) Bin(j, J, p^J)$$

In a step 716, the MPW solver 138 determines whether the serviceability level computed in the step 714 is less than the demanded serviceability $\delta$. If so, then J is incremented in a step 718, and flow of control returns to the step 712 so that the MPW solver 138 can determine whether the demanded serviceability level can be met with the current value of J.

If, on the other hand, the serviceability level achieved was not less than the demanded serviceability level, then in a step 720, the MPW solver 138 returns the values of J, $X^C$ and MPW_service (J,$X^C$).

Figure 8:
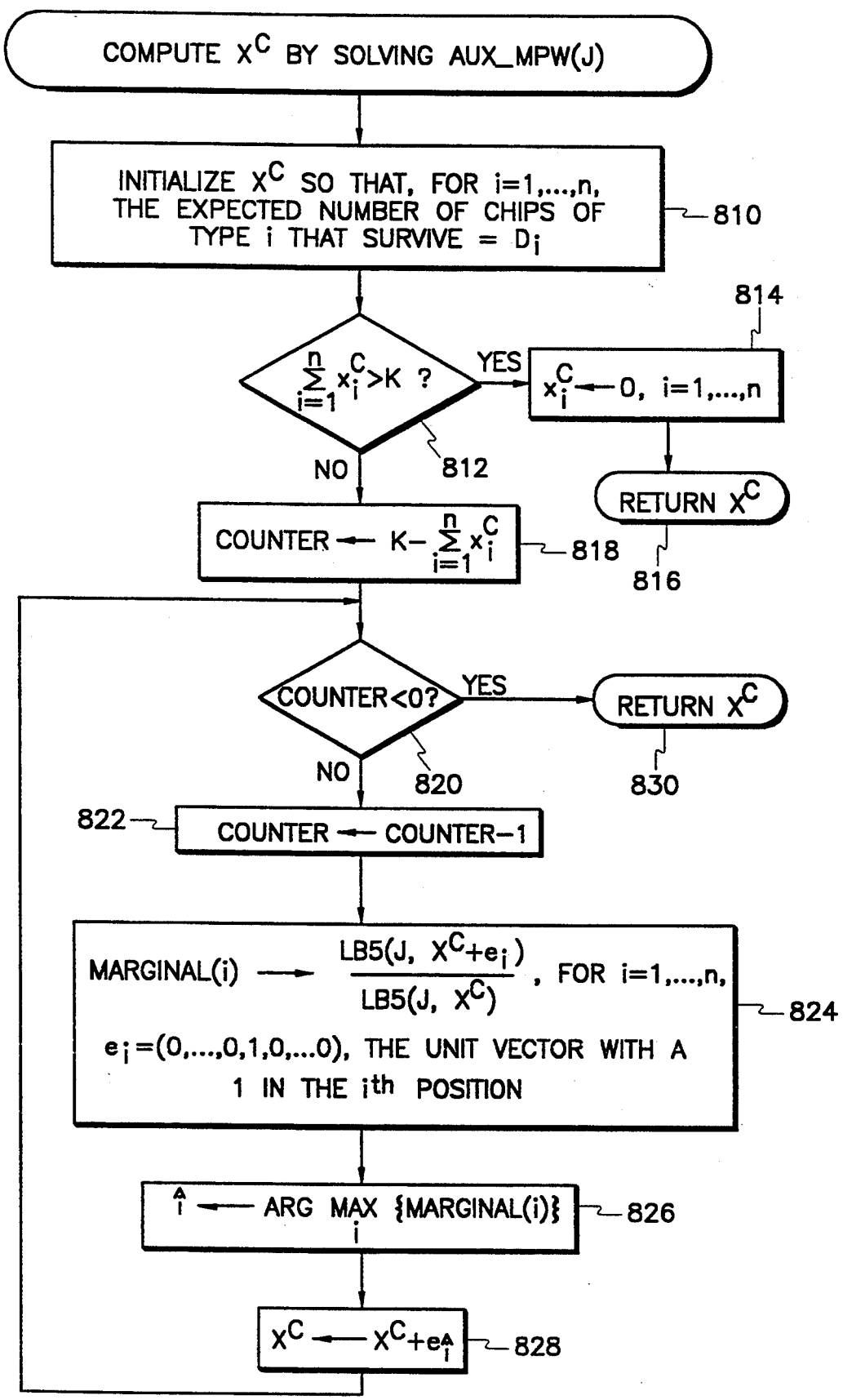
FIG. 8 is a flowchart which illustrates the operation of an auxiliary MPW (aux—MPW) solver of the MPW solver of FIG. 3C.

FIG. 8 is a flowchart which shows the operation of the aux_MPW solver 330. Looking at FIG. 8, in a step 810 the AUX_SPW initializer 322 initializes the decision variable values to feasible starting quantities. In configuring jobs for the P1 performance measure and the MPW scenario, the ultimate quantities are the decision variable values returned in a step 816 or 830, both of which are described below.

In a preferred embodiment, the AUX_MPW initializer 332 initializes $X^C$ so that, for all i, the expected number of good chips of type i is the demanded number ($D_i$). Specifically, for all i, it sets the decision variables as follows.

$$x_i^W = \left\lceil \frac{D_i}{JK_i p^J p_i^W p_i^C} \right\rceil$$

Roughly speaking, these values of $X^C$ provide a level of serviceability for each chip type of approximately 0.5. For most problems of interest, the desired level of serviceability is much greater than 0.5. Accordingly, the initial values can be shown to be componentwise less than the ultimate solution to the decision variable values Note that performance of the AUX_MPW solver 330 may be improved by initializing the decision variable values to greater values which still fall within the definition of feasible starting quantities. For example, the decision variable values could be initialized to the ground start ratio of chips of each of the chip types.

In a step 812, the MPW solver 138 determines whether the sum of all of the values of $X^C$ is greater than K (the number of chip sites on a standard multiple part wafer). If so, then the auxiliary program cannot be solved with J jobs. Accordingly, in a step 814 the MPW_service solver 328 sets the service level achieved (i.e., MPW_service) to zero. In a step 816, the values of $X^C$ are returned to the MPW solver 138. The MPW solver 138 will then determine (in the step 716) that MPW_service(J, $X^C$) is less than $\delta$ and increment J (in the step 718).

If, on the other hand, the sum of the values of $X^C$ is not greater than K, then processing is as follows. In a step 818 the AUX_MPW solver 330 initializes a counter to K minus the sum of the values of $x_i^C$ over all i. The counter facilitates carrying out steps 824 through 828

$$K - \sum_{i=1}^{n} x_i^C$$

times.

In a step 820, the AUX-MPW solver 330 determines whether the counter is less than zero. If not, then in a step 822, the value of the counter is decremented, and steps 824–828 are executed as follows.

In a step 824, the AUX_MPW marginal allocator 334 computes a marginal value for each value of i as follows:

$$\text{marginal}(i) = \frac{LB5(J, x^C + e_i)}{LB5(J, X^C)}$$

where $$LB5 = \prod_{i=1}^{n} \text{Prob}(Y_i(J, X_i^C) \geq D_i)$$

In a step 826, the AUX_MPW marginal allocator 334 selects the chip type for which the marginal value is greatest. In a step 828, the AUX_MPW marginal allocator 334 increments the number of chips of the selected type in the standard multiple part wafer $X^C$.

Flow of control then returns to the step 820 to determine whether the steps 822 through 828 have been carried out the appropriate number of times. Once they have been (i.e., once the counter equals zero), then in a step 830 the AUX_MPW solver 330 returns the values of $X^C$ to the MPW solver 138.

The operation of the mathematical optimization solver 122 in carrying out the step 216 of computing the job configuration 132 for the P2 performance measure of the SPJ scenario is shown in the flowchart of FIG. 9.

Solving P2 Performance Measure of MPW Scenario

The job configurer 110 configures jobs for the P2 performance measure and the MPW configuration as follows. In the step 210 of FIG. 2, the parameter determiner 116 of FIG. 1 receives the appropriate input parameters for MPW scenario. Specifically, it receives D (the demand for sets D), $u_i$ (the usage counts), W (the number of wafers in the standard multiple part job), K (the number of chip sites on a standard multiple part wafer), $p^J$ (the probability that the standard multiple part job is good), $p^W$ (the probability that the standard multiple part wafer is good given the job it is in is good) and $p_i^C$ (the probability that a chip of type i is good given that the job it is in is good and the wafer it is on is good).

In the step 212, the mathematical optimization generator 118 generates the mathematical optimization for the input parameter structures 124. For the P2 performance measure of the MPW scenario, the mathematical optimization would be:

Minimize J subject to a constraint (referred to as C6)

$$E\tilde{Z}(J; x_1^C, \ldots, x_n^C) \geq D \quad (C6)$$

$$\sum_{i=1}^{n} x_i^C = K$$

In the step 214, the mathematical optimization reformulator 120 replaces the constraint with a lower bound. For the P2 performance measure of the MPW scenario, the mathematical optimization reformulator 120 replaces the constraint C6 with an lower bound (referred to as LB6) as follows. For any a, $$EZ(J; x_1^C, \ldots, x_n^C) \geq a - \sum_{i=1}^{n} E(a - Y_i(J, x_i^C)/u_i)^+. \quad (LB6)$$

Note that the LB6 depends on the marginal $Y_i(J, x_i^C)$. The constant "a" becomes part of the decision variables $x^C$, so as to obtain a tight lower bound. Furthermore, the lower bound LB6 is (jointly) concave in (a $J, x_1^C, \ldots, x_n^C$).

The reformulated mathematical optimization 128 for the P2 performance measure of the MPW configuration (referred to as MPW-P2') is thus Minimize J subject to $$a - \sum_{i=1}^{n} E(a - Y_i(J, x_i^C)/u_i)^+ \geq D.$$

$$\sum_{i=1}^{n} x_i^C = K$$

In the step 216 of FIG. 2, the mathematical optimization solver 122 computes the job configuration 132 for the P1 performance measure of the MPW scenario. To solve the reformulated mathematical optimization for the P2 formulation measure of MPW, it is assumed that for a given number of jobs J, the random variables $Y_i(J, x_i^C)u_i$, $i=1, \ldots, n$ are normal. The means, $\mu_i(J, x_i^C)$, and variances, $\sigma_i^2(J, x_i^C)$ ($J, x_i$'s), are computed as functions of $x_i^C$ and J as follows:

$$\mu_i(J, x_{ii}^C) = JWx_i^C p^J p^W p_i^C/u_i$$

Let $\mu(J, x^C) = (\mu_i(J, x_i^C), \ldots, \mu_n(J, x_n^C))$ and $\sigma^2(J, x^C) = (\sigma_1^2(J, x_1^C), \ldots, \sigma_n^2(J, x_n^C))$. Let MAX-LB($J, x^C$) be the $$\sigma_i^2(J, x_i^C) = \mu_i(J, x_i^C)$$
$$(p_i^C(1-p^W)x_i^C + (1-p_i^C) + p^W p_i^C(1-p^J)Wx_i^C)$$
$$/u_i$$

maximum lower bound (MAX-LB) evaluated at (J, $x^C$).

Figure 11:
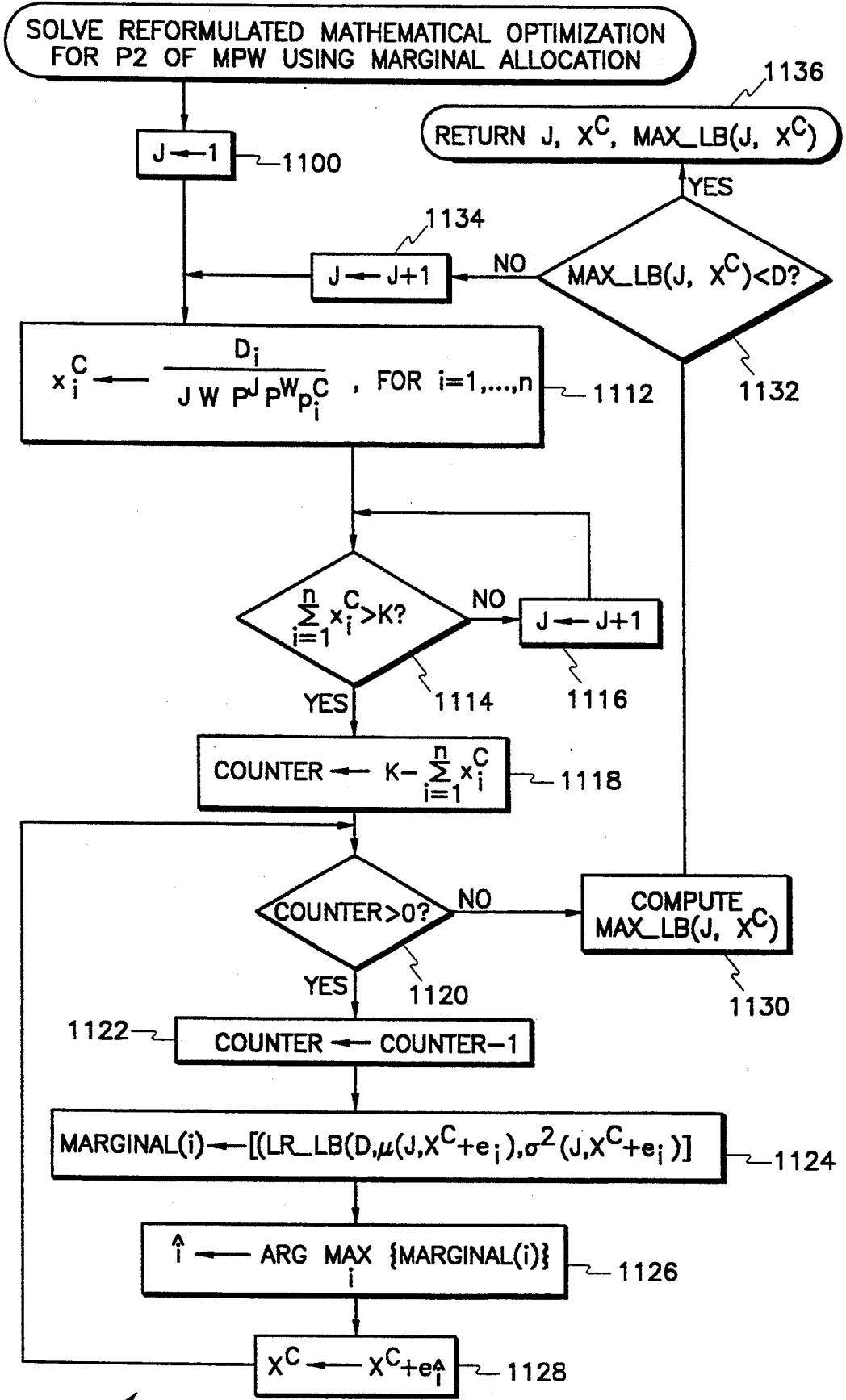
FIG. 11 is a flowchart which illustrates the operation of the MPW solver of FIG. 3C in computing a P2 formulation.

FIG. 11 is a flowchart which shows the operation of the MPW solver 138 in solving the P2 performance measure of the reformulated MPW mathematical optimization. Looking at FIG. 11, in a step 1110 the MPW initializer 326 initializes J (the number of jobs) to a feasible starting quantity. In configuring jobs for the P2 performance measure and the MPW scenario, the feasible starting quantity is the quantity of jobs required in the ultimate solution to the reformulated mathematical optimization, i.e., the quantity of jobs returned in a step 1136 described below.

In a preferred embodiment, the MPW initializer 326 initializes J to 1. Note that performance of the MPW solver 138 may be improved by initializing the decision variable values to greater values which still fall within the definition of feasible starting quantities.

In a step 1112, the MPW initializer 316 initializes $X^C$ to a feasible starting quantity of single part wafers of each chip type. In a preferred embodiment, the MPW initializer 326 sets the values of the decision variables as follows.

$$x_i^C = \left\lceil \frac{D_i}{JWp^J p^W p_i^C} \right\rceil$$

Note that performance of the MPW marginal allocator 340 may be improved by initializing the decision variable values to greater values which still fall within the definition of feasible starting quantities. For example, the decision variable values could be initialized to the ground start ratio of chips of each of the chip types.

In a step 1114, the MPW solver 138 determines whether the sum of $X_i^C$ over all i is greater than the number of sites on the standard multiple part wafer. If so, then the mathematical optimization cannot be solved for this value of J. Accordingly, in a step 1116, J is incremented. The above procedure is repeated until a possible starting point is obtained.

Steps 1118, 1120 and 1122 are then carried out to enable the MPW solver 138 to execute steps 1124-1128 the appropriate number of times. Specifically, in the step 1118 the MPW solver 138 sets a counter value to the amount by which K (the number of chips in the standard multiple part wafer) exceeds the sum of the chips represented in the decision variable $X^C$. In the step 1120, the MPW solver 138 determines whether the value of the counter is greater than 0. If so, then the value of the counter is decremented in a step 1122, and the steps 1124-1128 are carried out as follows.

In the step 1124, the MPW marginal allocator 336 computes a marginal value LR_LB(D,$\mu$(J, $X^C+e_i$), $\sigma^2$ (J, $X^W+e_i$)) for each chip type i. In a step 1126, the MPW marginal allocator 340 selects the chip type i for which the marginal value is greatest. In the step 1128, the MPW solver 138 increments the number of chips of the selected type in $X^C$. Flow of control then returns to the step 1120. Once the value of the counter is zero, then in a step 1130 the MAX_LB solver 342 of the MPW solver 138 computes MAX_LB (J, $X^C$). That is, it computes $$\sum_{i=1}^{n} (\mu_i \Phi(z_i) - \sigma_i \phi(z_i)) \quad \text{(MAX-LB)}$$

In a step 1132, the MPW solver 138 determines whether MAX_LB (J, $X^C$) is less than D (the demanded number of chip sets). If so, then in a step 1134 the MPW solver 138 increments J. Flow of control then returns to the step 1112 to recompute $X^C$ and MAX_LB (J, $X^C$).

Once MAX_LB (J, $X^C$) is greater than or equal to D, then in a step 1136 the MPW solver 138 returns J, $X^C$ and MAX_LB (J, $X^C$) to the MPW solver 138.

Manufacturing Chips According To Job Configuration

Once the mathematical optimization solver 122 has computed the job configuration 132, it routes the latter to the controller 130 of the semiconductor manufacturing line 114. In a step 218 of FIG. 2, the controller causes the semiconductor manufacturing line 114 to release jobs according to the job configuration 132. Specifically, the decision variables $X^J$; $X^W$ and J; or $X^C$ and J (for the SPJ, SPW and MPW scenarios, respectively) specify the number of single part jobs of each chip type; the number of single part wafers of each chip type in the standard multiple part job configuration and the number of jobs; or the number of chips of each type in the standard multiple part wafer and the number of jobs.

CONCLUSION

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to to secure by Letters Patent is:

1. A method of manufacturing a demanded quantity of chip sets at a desired serviceability level, each of the chip sets comprising a demanded quantity of chips of each of a plurality of chip types, the method comprising the steps of:
   (a) constructing an initial optimization program having:
      (i) decision variable values,
      (ii) an objective of minimizing a quantity of wafers used, and
      (iii) an initial constraint of producing the demanded quantity of chip sets at the desired serviceability level;
   (b) replacing said initial constraint with a lower bound so as to generate a reformulated optimization program, said lower bound being a constraint that is equal to a product of chip type probabilities, each of said chip type probabilities being equal to a probability that a quantity of chips of one of said chip types will be successfully manufactured when jobs are released into a semiconductor manufacturing line according to said decision variable values, each of said chip type probabilities being not less than respective chip demands associated with respective chip types;
   (c) determining said decision variable values by solving said reformulated optimization program; and
   (d) utilizing said solution of said reformulated optimization program to control a semiconductor manufacturing line by releasing jobs into said semiconductor manufacturing line as indicated by said decision variable values.

2. The method of claim 1, further comprising the step of receiving an input parameter specifying whether a job configuration scenario for the manufacturing is single part jobs, single part wafers, or multiple part wafers.

3. The method of claim 1, further comprising the step of receiving an input parameter specifying whether the desired serviceability level is a probability or an expectation.

4. The method of claim 3, further comprising the steps of:
   (a) computing an actual serviceability level given said input parameter; and
   (b) reporting said actual serviceability level.

5. The method of claim 1, wherein the desired serviceability level is an expectation and step (b) of claim 1 comprises the step of replacing said initial constraint with a maximum Lai-Robbins lower bound given said decision variable values.

6. The method of claim 1, wherein a job configuration scenario for the manufacturing is single part jobs and the desired serviceability level is a probability, and wherein step (c) of claim 1 comprises the steps of:
   (a) initializing said decision variable values to feasible starting quantities;
   (b) determining a value of said lower bound given said decision variable values; and
   (c) modifying said decision variable values, when said value of said lower bound is less than the desired serviceability level, by
      (i) performing marginal allocation to select one of the chip types, and (ii) incrementing one of said decision variable values to indicate an additional single part job of said selected chip type; and
(d) branching to step (b) of claim 6 when said value of said lower bound is less than the desired serviceability level.

7. The method of claim 1, wherein a job configuration scenario for the manufacturing is single part wafers and the desired serviceability level is an expectation, and wherein step (c) of claim 1 comprises the steps of:
(a) initializing said decision variable values to feasible starting quantities;
(b) determining a value of said lower bound given said decision variable values; and
(c) modifying said decision variable values, when said value of said lower bound is less than the desired serviceability level, by
(i) performing marginal allocation to select one of the chip types, and
(ii) incrementing one of said decision variable values to indicate an additional single part job of said selected chip type; and
(d) branching to step (b) of claim 7 when said value of said lower bound is less than the desired serviceability level.

8. The method of claim 1, wherein a job configuration scenario for the manufacturing is single part wafers and the desired serviceability level is a probability, and wherein step (c) of claim 1 comprises the steps of:
(a) initializing a quantity of jobs to a feasible starting quantity;
(b) constructing an auxiliary program for determining said decision variable values given said quantity of jobs;
(c) solving said auxiliary program given said quantity of jobs;
(d) determining a value of said lower bound given said decision variable values;
(e) incrementing said quantity of jobs when said value of said lower bound is less than the desired serviceability level; and
(f) branching to step (b) of claim 8 when said value of said lower bound is less than the desired serviceability level.

9. The method of claim 8, wherein step (c) of claim 8 comprises the steps of:
(a) initializing said decision variable values to feasible starting quantities;
(b) summing said decision variable values to compute an initial quantity of single part wafers in each of said jobs given said quantity of jobs; and
(c) modifying said decision variable values a number of times equal to the amount by which a required quantity of said single part wafers in each of said jobs exceeds said initial quantity of single part wafers, said modifying comprising the steps of:
(i) performing marginal allocation to select one of the chip types, and
(ii) incrementing one of said decision variable values to reflect an additional single part wafer of said selected chip type.

10. The method of claim 1, wherein a job configuration scenario for the manufacturing is single part wafers and the desired serviceability level is an expectation, and wherein step (c) of claim 1 comprises the steps of:
(a) initializing a quantity of said jobs to a feasible starting quantity;
(b) initializing said decision variable values to feasible starting quantities;
(c) summing said decision variable values to compute an initial quantity of said single part wafers in each of said jobs given said quantity of jobs;
(d) modifying said decision variable values a number of times equal to the amount by which a required quantity of single part wafers in each of said jobs exceeds said initial quantity of single part wafers, said modifying comprising the steps of:
(i) performing marginal allocation to select one of said chip types, and
(ii) incrementing one of said decision variable values to indicate an additional single part wafer of said selected chip type;
(e) computing a maximum quantity of said lower bound given of said decision variable values;
(f) incrementing said quantity of jobs when said maximum quantity of said lower bound is less than the demanded serviceability level; and
(g) branching to step (b) of claim 10 when said maximum quantity of said lower bound is less than the demanded serviceability level.

11. The method of claim 1, wherein a job configuration scenario for the manufacturing is multiple part wafers and the desired serviceability level is a probability, and wherein step (c) of claim 1 comprises the steps of:
(a) initializing a quantity of jobs to a feasible starting quantity;
(b) constructing an auxiliary program for determining said decision variable values given said quantity of jobs;
(c) solving said auxiliary program given said quantity of jobs;
(d) determining a value of said lower bound given said decision variable values;
(e) incrementing said quantity of jobs when said value of said lower bound is less than the desired serviceability level; and
(f) branching to step (b) of claim 11 when said value of said lower bound is less than the desired serviceability level.

12. The method of claim 11, wherein step (c) of claim 11 comprises the steps of:
(a) initializing said decision variable values to feasible starting quantities;
(b) summing said decision variable values to compute an initial quantity of said chip sites on said multiple part wafer;
(c) modifying said values of said decision variable a number of times equal to the amount by which a required quantity of said chip sites on each of said multiple part wafer exceeds said initial quantity of chip sites, said modifying comprising the steps of:
(i) performing marginal allocation to select one of said chip types, and
(ii) incrementing one of said decision variable values to indicate an additional chip of said selected chip type on said multiple part wafer.

13. The method of claim 1, wherein a job configuration scenario for the manufacturing is multiple part wafers and the desired serviceability level is an expectation, and wherein step (c) of claim 1 comprises the steps of:
(a) initializing a quantity of said jobs to a feasible starting quantity;

(b) initializing said decision variable values to feasible starting quantities;
(c) summing said decision variable values to compute an initial quantity of chip sites in each of said multiple part wafers given said quantity of jobs; and
(d) modifying said decision variable values a number of times equal to the amount by which a required quantity of chip sites on said multiple part wafers in each of said chip jobs exceeds said initial quantity of chip sites, said modifying comprising the steps of:
 (i) performing marginal allocation to select one of said chip types, and
 (ii) incrementing one of said decision variable values to reflect an additional chip of said selected chip type on each said multiple part wafer;
(e) computing a maximum quantity of said lower bound given of said decision variable values;
(f) incrementing said quantity of jobs when said maximum quantity of said lower bound is less than said demanded serviceability level; and
(g) branching to step (b) of claim 13 when said maximum quantity of said lower bound is less than said demanded serviceability level.

14. An apparatus for manufacturing a demanded quantity of chip sets at a desired serviceability level, each of the chip sets comprising a demanded quantity of chips of each of a plurality of chip types, the apparatus comprising:
(a) means for constructing an initial optimization program having:
 (i) decision variable values,
 (ii) an objective of minimizing a quantity of wafers used, and
 (iii) an initial constraint of producing the demanded quantity of chip sets at the desired serviceability level;
(b) means for replacing said initial constraint with a lower bound so as to generate a reformulated optimization program, said lower bound being a constraint that is equal to a product of chip type probabilities, each of said chip type probabilities being equal to a probability that a quantity of chips of one of said chip types will be successfully manufactured when jobs are released into a semiconductor manufacturing line according to said decision variable values, each of said chip type probabilities being not less than respective chip demands associated with respective chip types;
(c) means for determining said decision variable values by solving said reformulated optimization program; and
(d) means for utilizing said solution of said reformulated optimization program to control a semiconductor manufacturing line by releasing jobs into said semiconductor manufacturing line as indicated by said decision variable values.

15. The apparatus of claim 14, further comprising means for receiving an input parameter specifying whether a job configuration scenario for the manufacturing is single part jobs, single part wafers, or multiple part wafers.

16. The apparatus of claim 14, further comprising means for receiving an input parameter specifying whether the desired serviceability level is a probability or an expectation.

17. The apparatus of claim 16, further comprising:
(a) means for computing an actual serviceability level given said input parameter; and
(b) means for reporting said actual serviceability level.

18. The apparatus of claim 14, wherein the desired serviceability level is an expectation and said replacing means of claim 14 comprises means for replacing said initial constraint with a maximum Lai-Robbins lower bound given said decision variable values.

19. The apparatus of claim 14, wherein a job configuration scenario for the manufacturing is single part jobs and the desired serviceability level is a probability, and wherein said determining means of claim 14 comprises:
(a) means for initializing said decision variable values to feasible starting quantities;
(b) means for determining a value of said lower bound given said decision variable values; and
(c) means for modifying said decision variable values, when said value of said lower bound is less than the desired serviceability level, said modifying means of claim 19 comprising:
 (i) means for performing marginal allocation to select one of the chip types, and
 (ii) means for incrementing one of said decision variable values to indicate an additional single part job of said selected chip type; and
(d) means for invoking said determining means of claim 19 when said value of said lower bound is less than the desired serviceability level.

20. The apparatus of claim 14, wherein a job configuration scenario for the manufacturing is single part wafers and the desired serviceability level is an expectation, and said determining means of claim 14 comprises:
(a) means for initializing said decision variable values to feasible starting quantities;
(b) means for determining a value of said lower bound given said decision variable values; and
(c) means for modifying said decision variable values, when said value of said lower bound is less than the desired serviceability level, said modifying means of claim 20 comprising:
 (i) means for performing marginal allocation to select one of the chip types, and
 (ii) means for incrementing one of said decision variable values to indicate an additional single part job of said selected chip type; and
(d) means for invoking said determining means of claim 20 when said value of said lower bound is less than the desired serviceability level.

21. The apparatus of claim 14, wherein a job configuration scenario for the manufacturing is single part wafers and the desired serviceability level is a probability, and wherein said determining means of claim 14 comprises:
(a) means for initializing a quantity of jobs to a feasible starting quantity;
(b) means for constructing an auxiliary program for determining said decision variable values given said quantity of jobs;
(c) means for solving said auxiliary program given said quantity of jobs;
(d) means for determining a value of said lower bound given said decision variable values;
(e) means for incrementing said quantity of jobs when said value of said lower bound is less than the desired serviceability level; and
(f) means for invoking said constructing means of claim 21 when said value of said lower bound is less than desired serviceability level.

22. The apparatus of claim 21, wherein said auxiliary program solving means of claim 21 comprises:
   (a) means for initializing said decision variable values to feasible starting quantities;
   (b) means for summing said decision variable values to compute an initial quantity of single part wafers in each of said jobs given said quantity of jobs; and
   (c) means for modifying said decision variable values a number of times equal to the amount by which a required quantity of said single part wafers in each of said jobs exceeds said initial quantity of single part wafers, said modifying means of claim 22 comprising:
      (i) means for performing marginal allocation to select one of the chip types; and
      (ii) means for incrementing one of said decision variable values to reflect an additional single part wafer of said selected chip type.

23. The apparatus of claim 14, wherein a job configuration scenario for the manufacturing is single part wafers and the desired serviceability level is an expectation, and wherein said determining means for claim 14 comprises:
   (a) means for initializing a quantity of said jobs to a feasible starting quantity;
   (b) means for initializing said decision variable values to feasible starting quantities;
   (c) means for summing said decision variable values to compute an initial quantity of said single part wafers in each of said jobs given said quantity of jobs;
   (d) means for modifying said decision variable values a number of times equal to the amount by which a required quantity of single part wafers in each of said jobs exceeds said initial quantity of single part wafers, said modifying means of claim 23 comprising:
      (i) means for performing marginal allocation to select one of said chip types; and
      (ii) means for incrementing one of said decision variable values to indicate an additional single part wafer of said selected chip type;
   (e) means for computing a maximum quantity of said lower bound given of said decision variable values;
   (f) means for incrementing said quantity of jobs when said maximum quantity of said lower bound is less than the demanded serviceability level; and
   (g) means for invoking said decision variable initializing means of claim branching to said decision variable initialization means of claim 23 when said maximum quantity of said lower bound is less than the demanded serviceability level.

24. The apparatus of claim 14, wherein a job configuration scenario for the manufacturing is multiple part wafers and the desired serviceability level is a probability, and wherein said determining means of claim 14 comprises:
   (a) means for initializing a quantity of jobs to a feasible starting quantity;
   (b) means for constructing an auxiliary program for determining said decision variable values given said quantity of jobs;
   (c) means for solving said auxiliary program given said quantity of jobs;
   (d) means for determining a value of said lower bound given said decision variable values;
   (e) means for incrementing said quantity of jobs when said value of said lower bound is less than the desired serviceability level; and
   (f) means for invoking said constructing means of claim 24 when said value of said lower bound is less than the desired serviceability level.

25. The apparatus of claim 24, wherein said solving means of claim 24 comprises:
   (a) means for initializing said decision variable values to feasible starting quantities;
   (b) means for summing said decision variable values to compute an initial quantity of said chip sites on said multiple part wafer;
   (c) means for modifying said values of said decision variable a number of times equal to the amount by which a required quantity of said chip sites on each of said multiple part wafer exceeds said initial quantity of chip sites, said modifying means of claim 25 comprising:
      (i) means for performing marginal allocation to select one of said chip types; and
      (ii) means for incrementing one of said decision variable values to indicate an additional chip of said selected chip type on said multiple part wafer.

26. The apparatus of claim 14, wherein a job configuration scenario for the manufacturing is multiple part wafers and the desired serviceability level is an expectation, and wherein said determining means of claim 14 comprises:
   (a) means for initializing a quantity of said jobs to a feasible starting quantity;
   (b) means for initializing said decision variable values to feasible starting quantities;
   (c) means for summing said decision variable values to compute an initial quantity of chip sites in each of said multiple part wafers given said quantity of jobs; and
   (d) means for modifying said decision variable values a number of times equal to the amount by which a required quantity of chip sites on said multiple part wafers in each of said jobs exceeds said initial quantity of chip sites, said modifying means of claim 26 comprising:
      (i) means for performing marginal allocation to select one of said chip types; and
      (ii) means for incrementing one of said decision variable values to reflect an additional chip of said selected chip type on each said multiple part wafer;
   (e) means for computing a maximum quantity of said lower bound given of said decision variable values;
   (f) means for incrementing said quantity of jobs when said maximum quantity of said lower bound is less than said demanded serviceability level; and
   (g) means for invoking said decision variable initializing means of claim 26 when said maximum quantity of said lower bound is less than said demanded serviceability level.

27. A method of manufacturing a demanded quantity of chip sets at a desired serviceability level, each of the chip sets comprising a demanded quantity of chips of each of a plurality of chip types, the method comprising the steps of:
   (a) constructing an initial optimization program that operates in accordance input parameters, including wafer yield data and job yield data, said initial optimization program defining:

(i) decision variable values,
(ii) an objective of minimizing a quantity of wafers used,
(iii) a wafer loss model for modeling yield loss using said wafer yield data
(iv) a job loss model for modeling yield loss using said job yield data, and
(v) a procedure of using said wafer loss model and said job loss model to satisfy an initial constraint of producing the demanded quantity of chip sets at the desired serviceability level;

(b) replacing said initial constraint with a lower bound so as to generate a reformulated optimization program;

(c) determining said decision variable values by solving said reformulated optimization program; and (d) using said solution of said reformulated optimization program to control a semiconductor manufacturing line by releasing jobs into said semiconductor manufacturing line as indicated by said decision variable values.

28. An apparatus for manufacturing a demanded quantity of chip sets at a desired serviceability level, each of the chip sets comprising a demanded quantity of chips of each of a plurality of chip types, the apparatus comprising:

(a) means for constructing an initial optimization program that operates in accordance with input parameters, including wafer yield data and job yield data, said initial optimization program defining;
(i) decision variable values,
(ii) an objective of minimizing a quantity of wafers used,
(iii) a wafer loss model for modeling yield loss using said wafer yield data
(iv) a job loss model for modeling yield loss using said job yield data, and
(v) (iv) a procedure of using said wafer loss model and said job loss model to satisfy an initial constraint of producing the demanded quantity of chip sets at the desired serviceability level;

(b) means for replacing said initial constraint with a lower bound so as to generate a reformulated optimization program;

(c) means for determining said decision variable values by solving said reformulated optimization program; and (d) means for using said solution of said reformulated optimization program to control a semiconductor manufacturing line by releasing jobs into said semiconductor manufacturing line as indicated by said decision variable values.

* * * * *